(12) United States Patent
Khaitan et al.

(10) Patent No.: US 10,810,238 B2
(45) Date of Patent: Oct. 20, 2020

(54) DECOUPLED ARCHITECTURE FOR QUERY RESPONSE GENERATION

(71) Applicant: SAP SE, Walldorf (DE)

(72) Inventors: Priyanka Khaitan, Cupertino, CA (US); Haichao Wei, Santa Clara, CA (US); Kevin Hsu, Cupertino, CA (US); Mitchell Clark, Alexandria, VA (US)

(73) Assignee: SAP SE, Walldorf (DE)

( * ) Notice: Subject to any disclaimer, the term of this patent is extended or adjusted under 35 U.S.C. 154(b) by 331 days.

(21) Appl. No.: 15/459,385

(22) Filed: Mar. 15, 2017

(65) Prior Publication Data

US 2018/0157727 A1    Jun. 7, 2018

Related U.S. Application Data

(60) Provisional application No. 62/430,700, filed on Dec. 6, 2016.

(51) Int. Cl.
| | |
|---|---|
| *G06F 16/248* | (2019.01) |
| *G06F 16/84* | (2019.01) |
| *G06F 16/332* | (2019.01) |
| *G06F 16/9535* | (2019.01) |
| *G06F 16/25* | (2019.01) |

(Continued)

(52) U.S. Cl.
CPC ........ *G06F 16/3325* (2019.01); *G06F 16/252* (2019.01); *G06F 16/258* (2019.01); *G06F 16/3322* (2019.01); *G06F 16/3329* (2019.01); *G06F 16/84* (2019.01); *G06F 16/986* (2019.01)

(58) Field of Classification Search
CPC .................................................. G06F 16/84
See application file for complete search history.

(56) References Cited

U.S. PATENT DOCUMENTS 8,408,459 B1 *  4/2013  Alonzo ................. G06Q 10/08
                                                    235/385
10,503,744 B2   12/2019  Khaitan et al.
(Continued)

OTHER PUBLICATIONS

"U.S. Appl. No. 15/459,342, Non Final Office Action dated Jan. 22, 2019", 11 pgs.

(Continued)

*Primary Examiner* — James Trujillo
*Assistant Examiner* — J Mitchell Curran
(74) *Attorney, Agent, or Firm* — Schwegman Lundberg & Woessner, P.A.

(57) ABSTRACT

Systems and methods are provided for receiving a plurality of queries from plurality of channels via a plurality of computing devices. For each query of the plurality of queries systems and methods are provided for determining a use case associated with the query from a plurality of predetermined use cases, determining transformation rules for data associated with the use case, accessing data from at least one data source of a plurality of data sources to generate response data for a response to the query, the plurality of data sources comprising the data in a plurality of different data formats, transforming the data associated with the use case from at least a first format into a uniform data structure comprising the response data using the transformation rules for the response data, and providing the response data in the uniform data structure.

20 Claims, 17 Drawing Sheets

(51) Int. Cl.
*G06F 16/958* (2019.01)
*G06F 16/2457* (2019.01)

(56) References Cited

U.S. PATENT DOCUMENTS

| | | | |
|---|---|---|---|
| 2002/0129024 A1* | 9/2002 | Lee | G06F 21/41 |
| 2003/0004938 A1 | 1/2003 | Lawder | |
| 2005/0289124 A1* | 12/2005 | Kaiser | G06F 16/24522 |
| 2008/0077598 A1 | 3/2008 | Wilmering et al. | |
| 2008/0154877 A1 | 6/2008 | Joshi et al. | |
| 2009/0248661 A1 | 10/2009 | Bilenko et al. | |
| 2012/0265787 A1 | 10/2012 | Hsu et al. | |
| 2013/0018872 A1 | 1/2013 | Velipasaoglu | |
| 2013/0055097 A1 | 2/2013 | Soroca et al. | |
| 2014/0372349 A1 | 12/2014 | Driscoll | |
| 2015/0039292 A1 | 2/2015 | Suleman et al. | |
| 2015/0161521 A1* | 6/2015 | Shah | G06F 17/278 706/12 |
| 2015/0347500 A1 | 12/2015 | Li et al. | |
| 2016/0055222 A1* | 2/2016 | Sarferaz | G06F 16/28 707/603 |
| 2016/0063043 A1 | 3/2016 | Carroll et al. | |
| 2016/0078083 A1* | 3/2016 | Han | G06F 16/90328 704/275 |
| 2016/0084076 A1 | 3/2016 | Fanini et al. | |
| 2016/0179953 A1 | 6/2016 | Klotz, Jr. et al. | |
| 2017/0004184 A1 | 1/2017 | Jain et al. | |
| 2017/0068683 A1 | 3/2017 | Bakshi et al. | |
| 2017/0103039 A1 | 4/2017 | Shamis et al. | |
| 2017/0228240 A1 | 8/2017 | Khan et al. | |
| 2017/0242886 A1 | 8/2017 | Jolley et al. | |
| 2017/0270159 A1 | 9/2017 | Wang et al. | |
| 2018/0157721 A1 | 6/2018 | Khaitan et al. | |
| 2018/0157739 A1 | 6/2018 | Khaitan et al. | |
| 2020/0034360 A1 | 1/2020 | Khaitan et al. | |

OTHER PUBLICATIONS

"U.S. Appl. No. 15/459,342, Response filed Mar. 29, 2019 to Non Final Office Action dated Jan. 22, 2019", 14 pgs.
"U.S. Appl. No. 15/459,447, Non Final Office Action dated Mar. 29, 2019", 12 pgs.
"U.S. Appl. No. 15/459,342, Advisory Action dated Sep. 26, 2019", 2 pgs.
"U.S. Appl. No. 15/459,342, Final Office Action dated Jul. 11, 2019", 14 pgs.
"U.S. Appl. No. 15/459,342, Response filed Sep. 9, 2019 to Final Office Action dated Jul. 11, 2019", 14 pgs.
"U.S. Appl. No. 15/459,447, Notice of Allowance dated Jul. 29, 2019", 7 pgs.
"U.S. Appl. No. 15/459,447, Response filed Jun. 14, 2019 to Non Final Office Action dated Mar. 29, 2019", 14 pgs.
U.S. Appl. No. 15/459,342, filed Mar. 15, 2017, Digital Assistant Query Intent Recommendation Generation.
U.S. Appl. No. 15/459,447, filed Mar. 15, 2017, Dialog System for Transitioning Between State Diagrams.
U.S. Appl. No. 16/595,205, filed Oct. 7, 2019, Dialog System for Transitioning Between State Diagrams.
"U.S. Appl. No. 15/459,342, Non Final Office Action dated Feb. 19, 2020", 13 pgs.
"U.S. Appl. No. 15/459,342, Response filed May 6, 2020 to Non Final Office Action dated Feb. 19, 2020", 14 pgs.
"U.S. Appl. No. 15/459,447, Corrected Notice of Allowability dated Oct. 17, 2019", 5 pgs.

* cited by examiner

DECOUPLED ARCHITECTURE FOR QUERY RESPONSE GENERATION

CROSS-REFERENCE TO RELATED APPLICATIONS

This application claims the benefit of U.S. Provisional Application No. 62/430,700, filed Dec. 6, 2016, entitled "CONFIGURATION OF A VOICE-ACTIVATED DIGITAL ASSISTANT," which is incorporated herein by reference in its entirety.

BACKGROUND

An enterprise resource planning (ERP) system may provide integrated applications and technology to automate many back office functions related to technology, services, and human resources (for example). For example, ERP software may integrate various functions of an operation, such as product planning, development, manufacturing, sales and marketing, in a database application and user interface. Accordingly, an ERP system may have a functionally heavy interface against millions of user entries.

BRIEF DESCRIPTION OF THE DRAWINGS

Various ones of the appended drawings merely illustrate example embodiments of the present disclosure and should not be considered as limiting its scope.

DETAILED DESCRIPTION

Systems and methods described herein relate to configuration and functionality of a digital assistant. In one example, the digital assistant is a voice activated digital assistant.

As explained above, an ERP system may have a functionally heavy interface against millions of user entries. Embodiments described herein describe digital assistant functionality, such as recommendation and machine learning, a decoupled framework that supports multiple data sources and transformation rules, state diagrams for managing dialog in the digital assistant, and so forth.

Embodiments described herein may simplify user interactions in a natural way and break down complexity in accessing information for data driven decisions. Moreover, embodiments described herein provide for contextual insights and intelligence processes. In example embodiments, the system learns from user interactions and contextual data to enable and define new business processes and also help make applications proactive.

Figure 1:
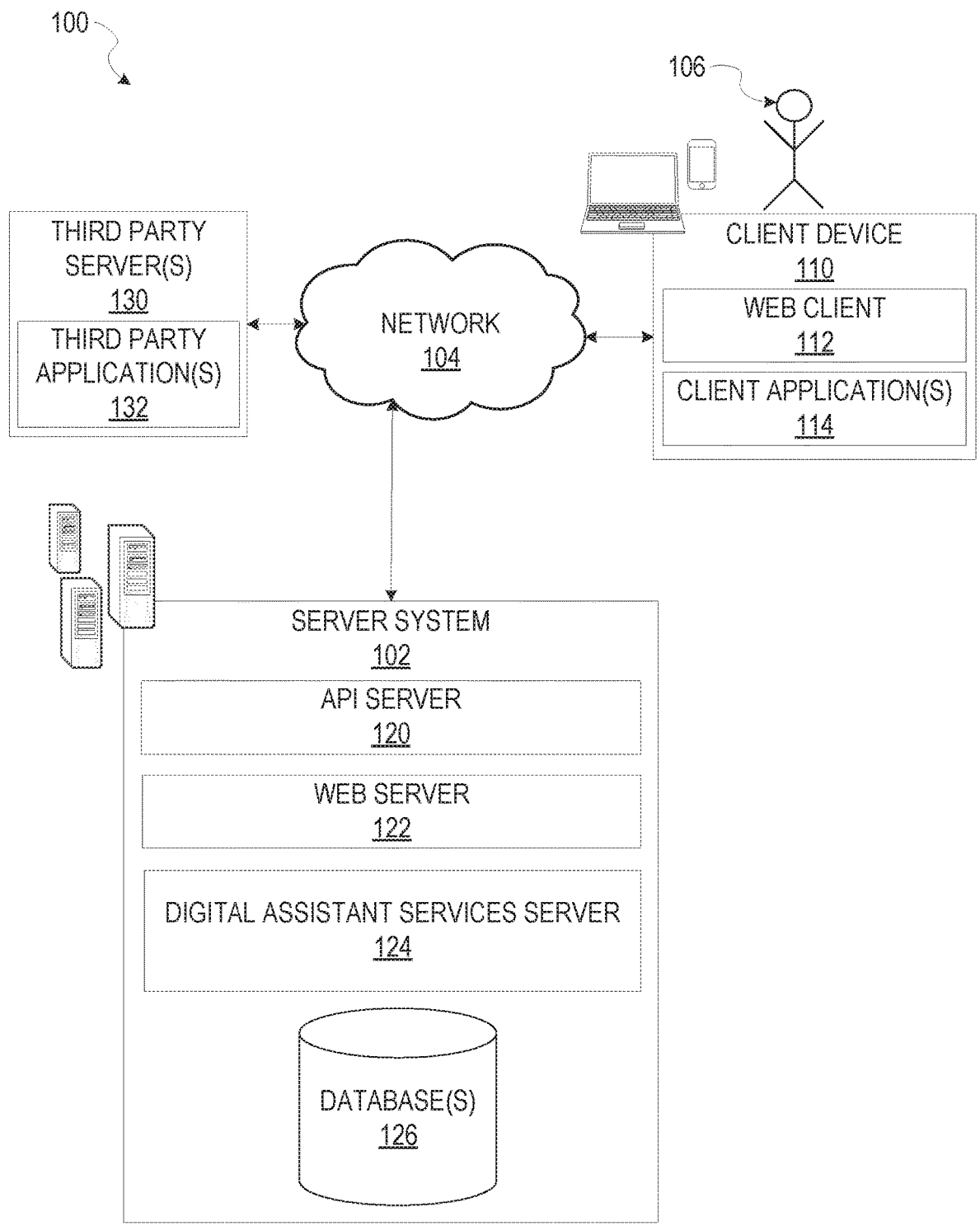
FIG. 1 is a block diagram illustrating a networked system, according to some example embodiments.

FIG. 1 is a block diagram illustrating a networked system 100, according to some example embodiments. The system 100 may include one or more client devices such as client device 110, also referred to herein as "computing device." The client device 110 may comprise, but is not limited to, a mobile phone, desktop computer, laptop, portable digital assistant (PDA), smart phone, tablet, ultrabook, netbook, laptop, multi-processor system, microprocessor-based or programmable consumer electronic, game console, set-top box, computer in a vehicle, or any other communication device that a user may utilize to access the networked system 100. In some embodiments, the client device 110 may comprise a display module (not shown) to display information in the form of user interfaces). In further embodiments, the client device 110 may comprise one or more of touch screens, accelerometers, gyroscopes, cameras, microphones, global positioning system (GPS) devices, and so forth. The client device 110 may be a device of a user that is used to request and receive information via a digital assistant, and so forth.

One or more users 106 may be a person, a machine, or other means of interacting with the client device 110. In example embodiments, the user 106 may not be part of the system 100, but may interact with the system 100 via the client device 110 or other means. For instance, the user 106 may provide input (e.g., voice, touch screen input, alphanumeric input, etc.) to the client device 110 and the input may be communicated to other entities in the system 100 (e.g., third party servers 130, server system 102, etc.) via a network 104. In this instance, the other entities in the system 100, in response to receiving the input from the user 106, may communicate information to the client device 110 via the network 104 to be presented to the user 106. In this way, the user 106 may interact with the various entities in the system 100 using the client device 110.

The system 100 may further include a network 104. One or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public &witched telephone network (PSTN), a cellular telephone network, a wireless network, a WiFi network, a WiMax network, another type of network, or a combination of two or more such networks.

The client device 110 may access the various data and applications provided by other entities in the system 100 via web client 112 (e.g., a browser, such as the Internet Explorer® browser developed by Microsoft® Corporation of Redmond, Washington State) or one or more client applications 114. The client device 110 may include one or more client applications 114 (also referred to as "apps") such as, but not limited to, a web browser, messaging application, electronic mail (email) application, an e-commerce site application, a mapping or location application, a digital assistant application, and the like.

In some embodiments, one or more client applications 114 may be included in a given one of the client device 110, and configured to locally provide the user interface and at least some of the functionalities, with the client application 114 configured to communicate with other entities in the system 100 (e.g., third party servers 130, server system 102, etc.), on an as needed basis, for data and/or processing capabilities not locally available (e.g., access ERP or customer relationship management (CRM) data, to request data, to authenticate a user 106, to verify a method of payment, etc.). Conversely, one or more applications 114 may not be included in the client device 110, and then the client device 110 may use its web browser to access the one or more applications hosted on other entities in the system 100 (e.g., third party servers 130, server system 102, etc.)

A server system 102 may provide server-side functionality via the network 104 (e.g., the Internet or wide area network (WAN)) to one or more third party servers 130 and/or one or more client devices 110. The server system 102 may include an application program interface (API) server 120, a web server 122, and digital assistant services server 124, that may be communicatively coupled with one or more databases 126.

The one or more databases 126 may be one or more storage devices that store data related to an ERP system, user data, and other data. The one or more databases 126 may further store information related to third party servers 130, third party applications 132, client devices 110, client applications 114, users 106, and so forth. The one or more databases 126 may include cloud-based storage in some embodiments.

The server system 102 may be a cloud computing environment, according to some example embodiments. The server system 102, and any servers associated with the server system 102, may be associated with a cloud-based application, in one example embodiment.

The digital assistant services server 124 may provide back-end support for third party applications 132 and client applications 114, which may include cloud-based applications. The digital assistant services server 124 may receive queries, process queries, generate responses to queries, and so forth. Services provided by the server system 102 (e.g., via the digital assistant services server 124) may be a RESTful service from a user question to a response to the question.

The system 100 may further include one or more third party servers 130. The one or more third party servers 130 may include one or more third party application(s) 132. The one or more third party application(s) 132, executing on third party server(s) 130, may interact with the server system 102 via API server 120 via a programmatic interface provided by the API server 120. For example, one or more the third party applications 132 may request and utilize information from the server system 102 via the API server 120 to support one or more features or functions on a website hosted by the third party or an application hosted by the third party. The third party website or application 132, for example, may provide digital assistant services functionality that is supported by relevant functionality and data in the server system 102.

Figure 2:
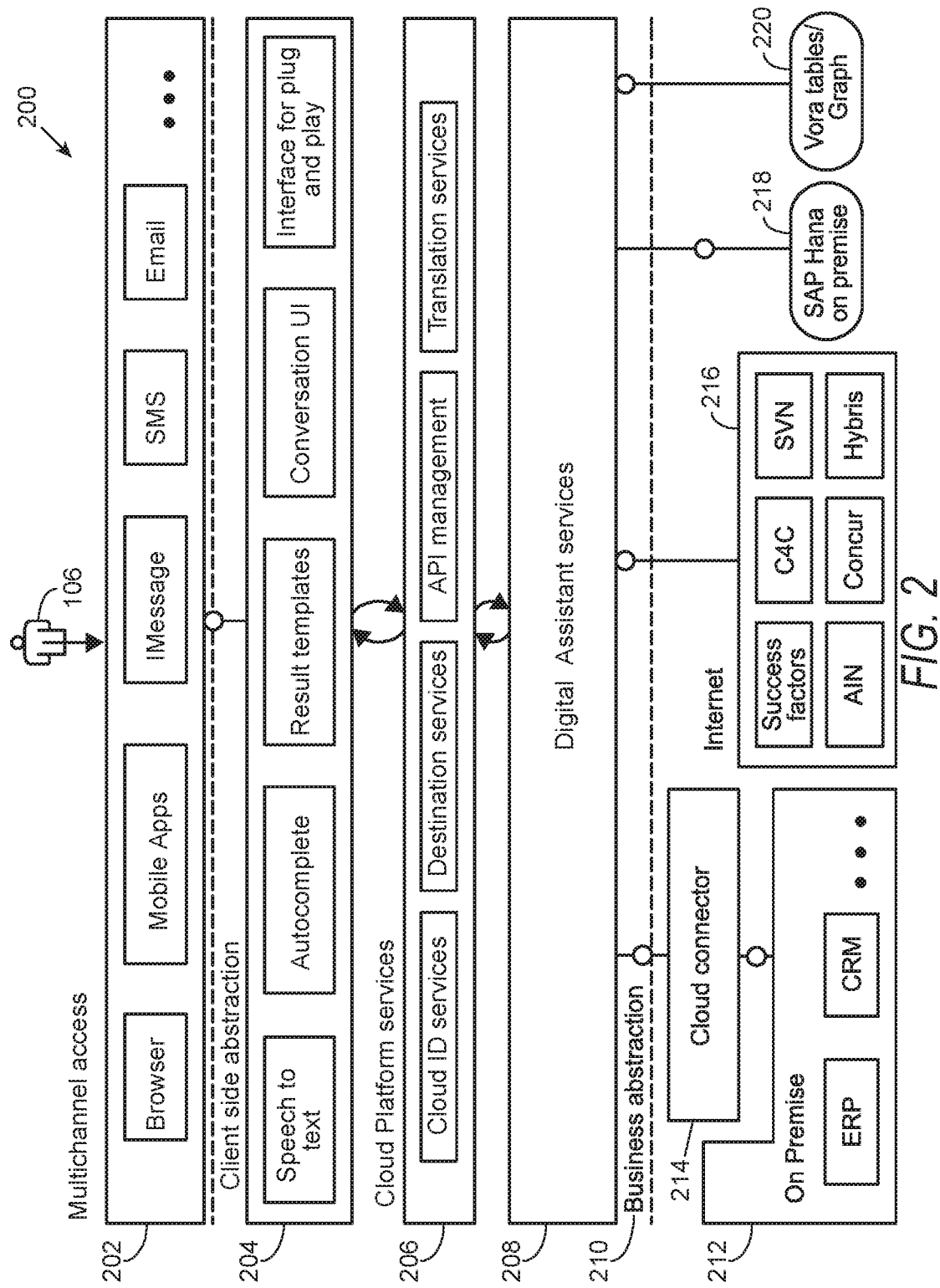
FIG. 2 is a block diagram of an example system, according to some example embodiments.

FIG. 2 is a block diagram of an example system 200. The system 200 comprises multichannel access 202 for a user 106, such as a browser, mobile apps, Message, short message service (SMS), email, and so forth (e.g., via client device 110). The system 200 further comprises client-side abstraction 204 such as speech to text, autocomplete, result templates, conversation user interface (UI), interface for plug and play, and so forth. The system 100 further comprises cloud platform services 206 and digital assistant services 208. Digital assistant services may comprise various components and services related to digital assistant functionality. The system 200 may further comprise a business abstraction layer 210 to interact with on premise systems 212, such as ERP and on premise CRM via a cloud connector service 214. The business abstraction layer may further interact with internet services 216, other on premise systems, such as SAP Hana on premise 218, Vora tables/Graph 220, and so forth.

Figure 3:
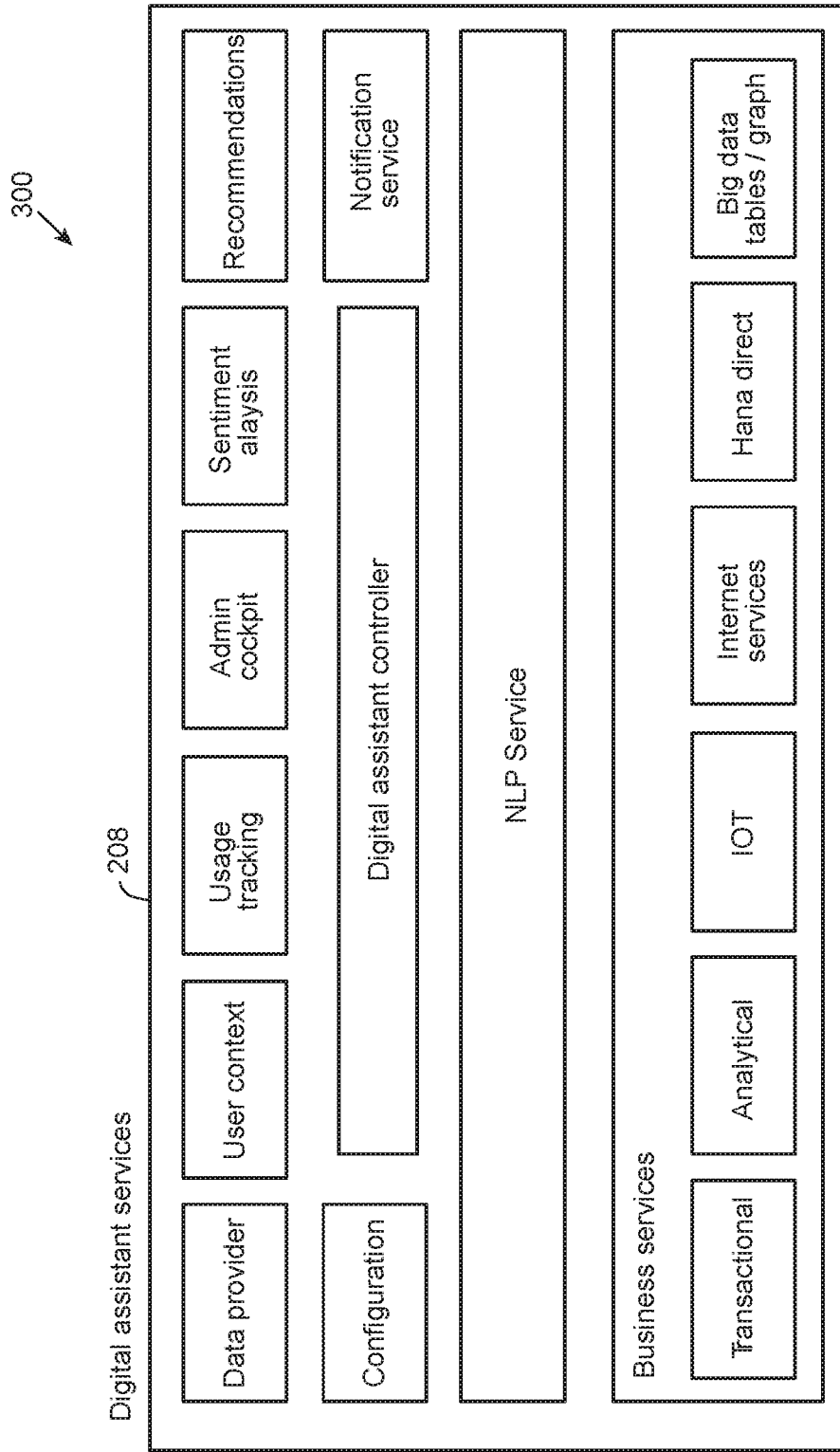
FIG. 3 is a block diagram illustrating example components of digital assistant services, according to some example embodiments.
Figure 4:
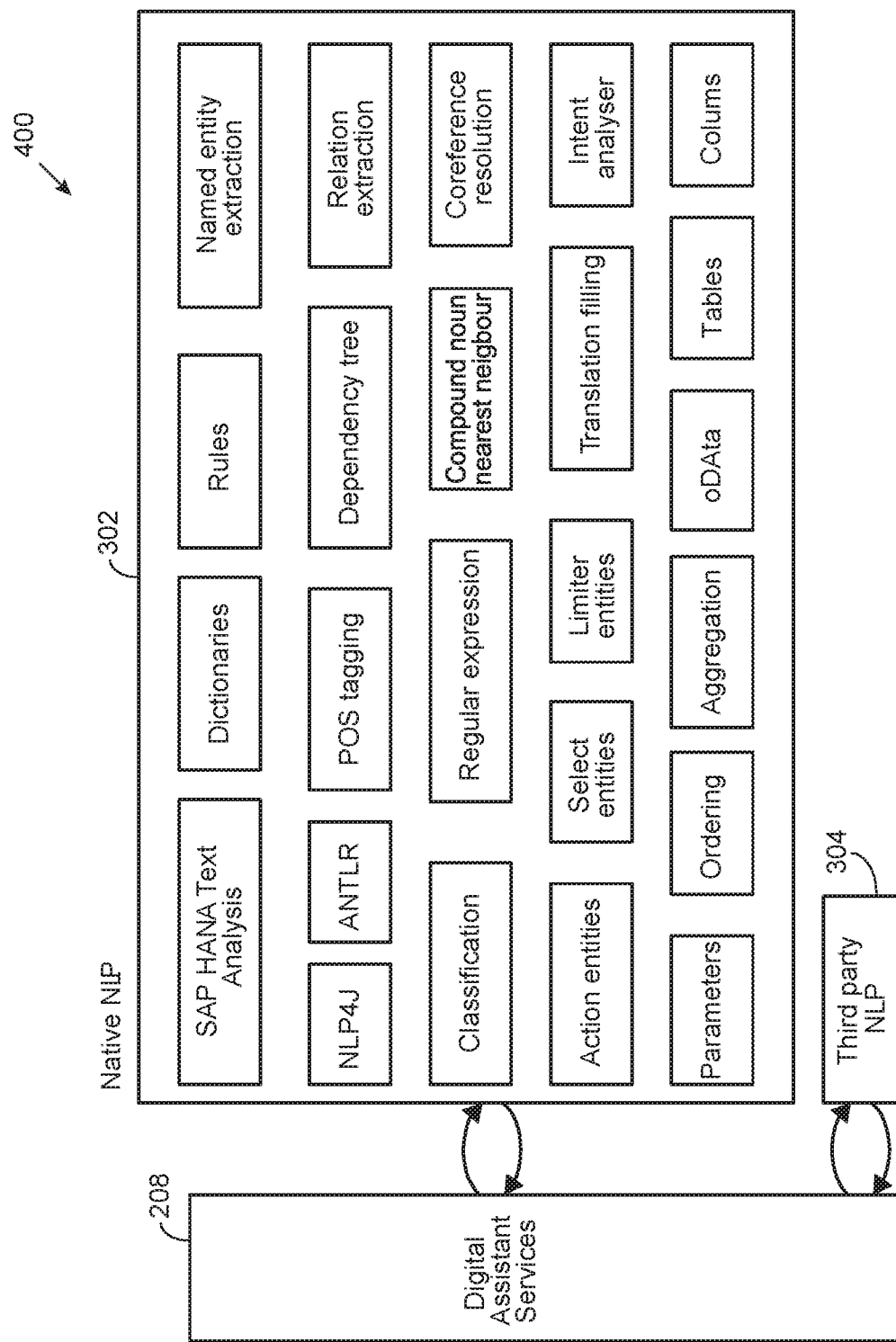
FIG. 4 is a block diagram illustrating example components of a natural language processing (NLP) service, according to some example embodiments.

FIG. 3 is a block diagram 300 illustrating additional details for the digital assistant services 208. FIG. 4 is a block diagram 400 illustrating additional details for the NLP service, comprising a native NLP 302 and third party NLP 304, and interaction with the digital assistant services 208.

Figure 5:
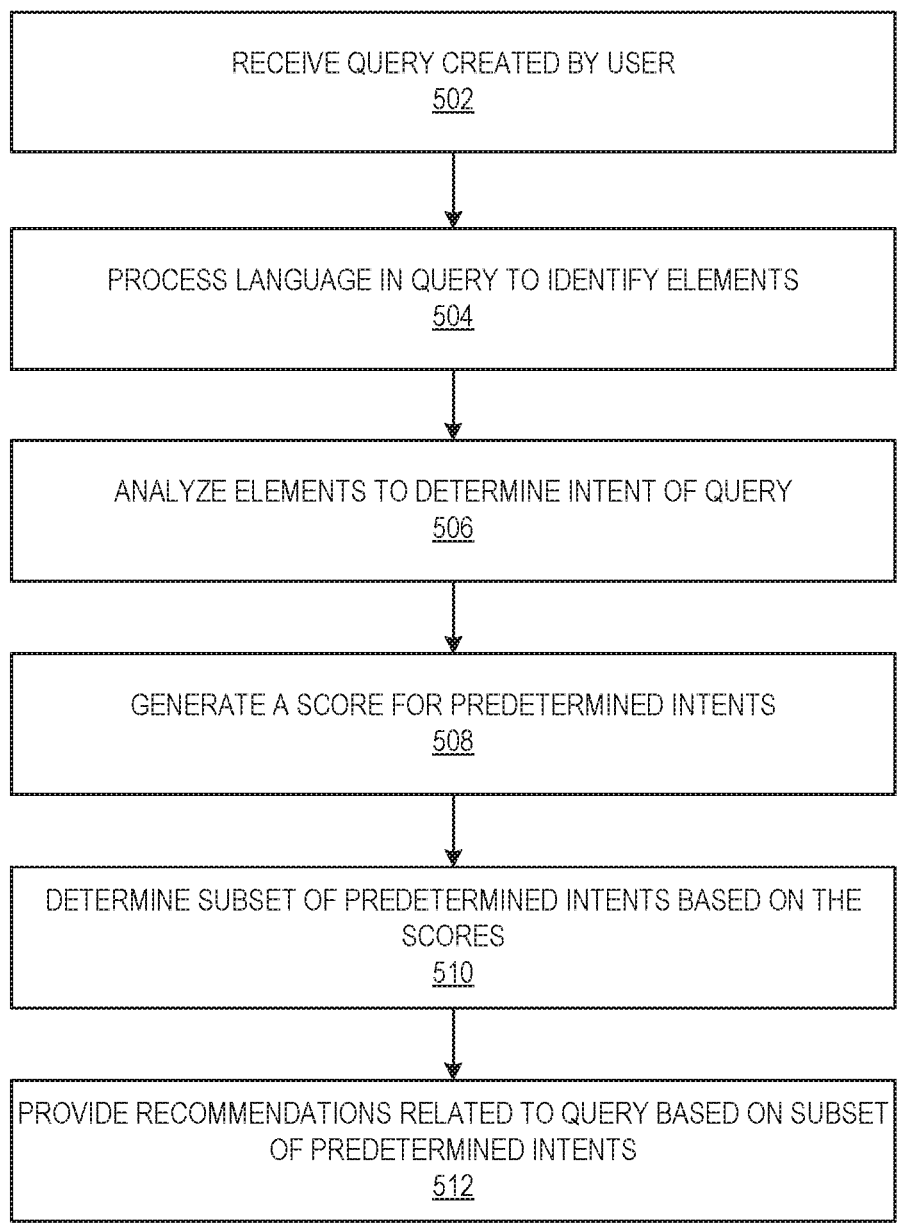
FIG. 5 is a flow chart illustrating aspects of a method, according to some example embodiments, for generating recommendations related to a query.

FIG. 5 is a flow chart illustrating aspects of a method 500, according to some example embodiments, for generating recommendations related to a query. For illustrative purposes, method 500 is described with respect to the networked system 100 of FIG. 1. It is to be understood that method 500 may be practiced with other system configurations in other embodiments.

Figure 6:
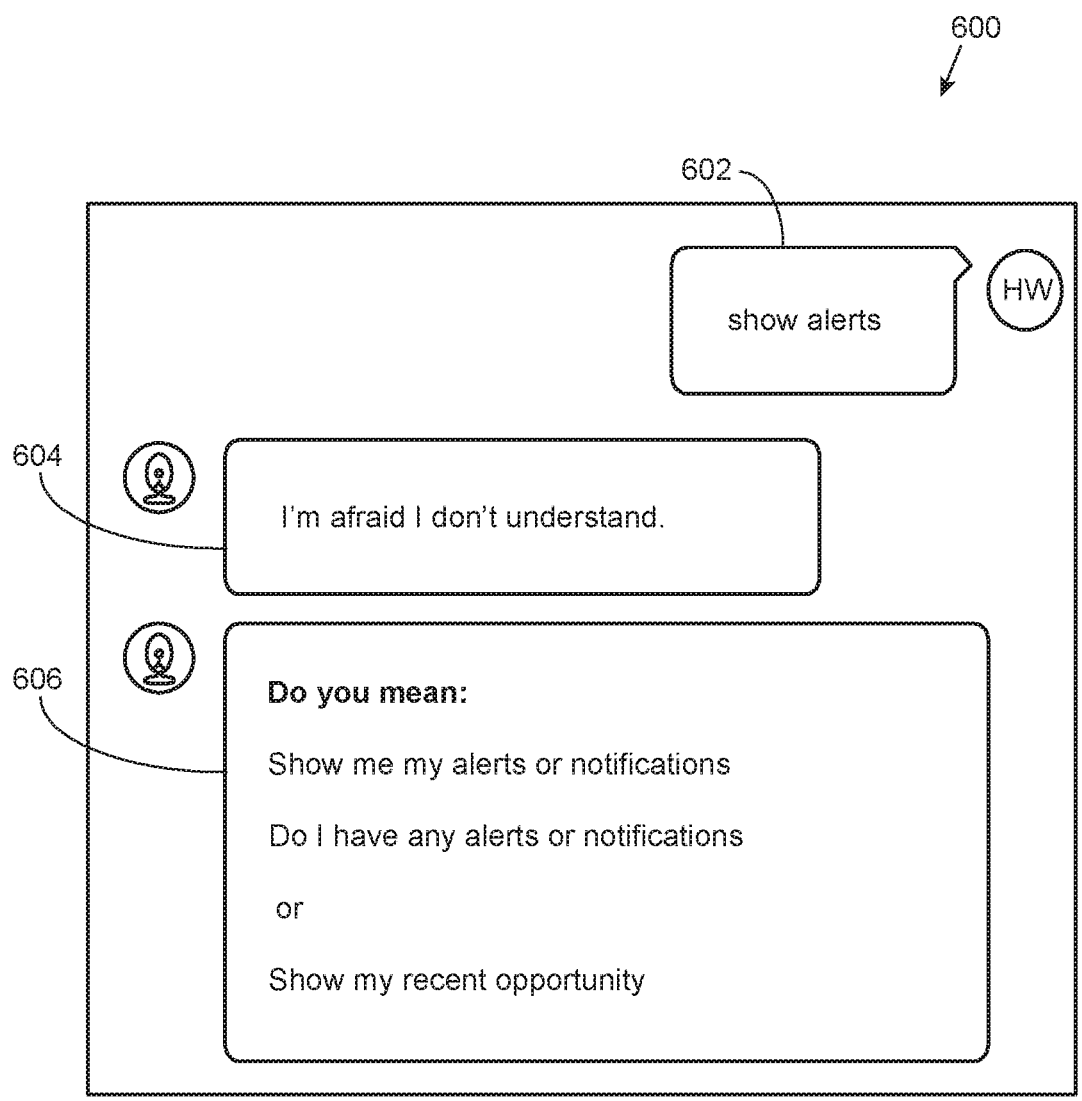
FIG. 6 illustrates an example user interface, according to some example embodiments.

In operation 502, the server system 102 (e.g., via digital assistant services server 124) receives a query created by a user 106. FIG. 6 illustrates an example user interface 600 according to some embodiments. In the example in FIG. 6, a user 106 may input a query 602, such as "show alerts" via the user interface 600 on a client device 110 (e.g., via voice input, text input, etc.). This query 602 is sent by the client device 110 to the digital assistant services server 124 for processing.

The digital assistant services server 124 may have access to a knowledge base (e.g., stored in one or more databases 126) that includes a predefined set of intents to be used to response to a query. In one example, the digital assistant services server 124 may not have modeled a query in the exact language used by the user 106, and thus, the query is not included in the predefined set of intents in the knowledge base. For example, the server system 102 may have modeled queries such as "Show me my sales contact for company X" or "show me my contact for company X" but may not have modeled a query such as "sales" or "show alerts" or understand exactly what the user 106 may be requesting. Accordingly, the digital assistant services server 124 comprises recommendation services to respond to queries where the query is not clear or previously modeled. Moreover, the server system 102 may learn from the selection of recommendation by the user 106 so that next time the user 106 inputs a similar query, it will be able to respond appropriately. The server system 102 may also unlearn from responses from the user 106. In various examples, the server system 102 may use a scoring system, user or organization profiles, systems defaults, and so forth, to determine an intent associated with a query.

At both design time and run time, the different ways of identifying a user's intent by natural language may be done using technologies, such as linguistic analysis, tokenization, Lemmatization, part-of-speech (POS) tagging, dependency parser, entity recognition, or other such technologies.

Figure 7:
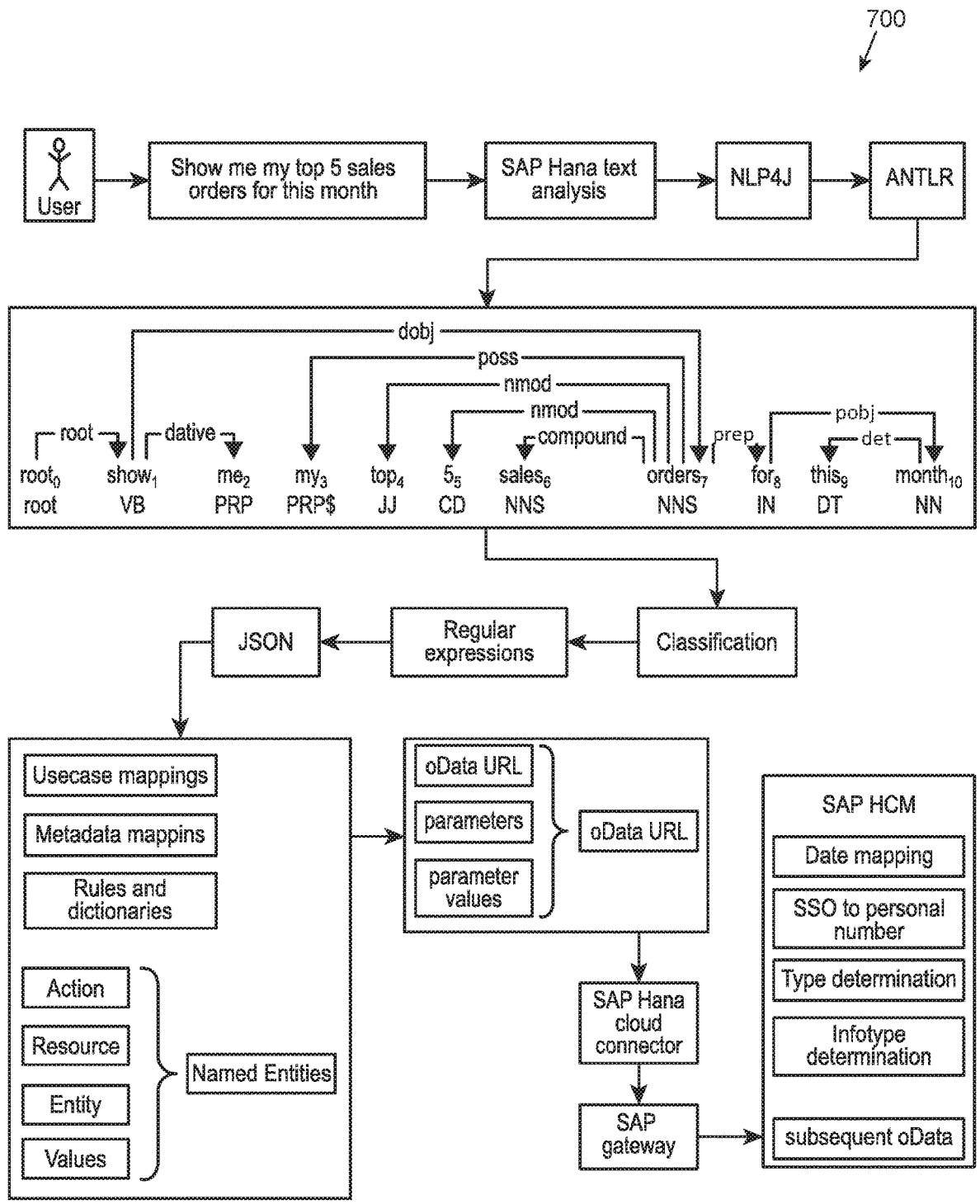
FIG. 7 illustrates an example flow of a query being processed and transformed to an oData or SQL request, according to some example embodiments.

In operation 504, the digital assistant services server 124 processes language in the query to identify elements of the query. For example, the digital assistant services server 124 may process language in the query to identify a plurality of elements associated with the query. The digital assistant services server 124 may use natural language processing (NLP) technology such as a native NLP or third party NLP as shown in FIG. 4. FIG. 7 shows an example flow 700 of a query "Show me my top 5 sales orders for this month" being processed and transformed to an oData or SQL Request.

In one example, an NLP input may include the user query, and an NLP output may comprise data associated with the query. In one example, the data that is output from the NLP may be in the form of a JSON object. In one example, the JSON object may comprise:

Original query
Returned query
Resource
Action
Context
EntityType
Entity Value
EntityPosition In one example, the NLP input may be "show me my top 5 sales opportunities last quarter." The NLP output may be a JSON object comprising the following information:

Original query: show me my top 5 sales opportunities last quarter
Returned query: show me my top 5 sales opportunities from Apr. 1, 2016 to Jun. 30, 2016
Entity Type: Integer
EntityValue: 5
EntityPosition: 1
EntityType: DATE
EntityValue: Apr. 1, 2016
EntityPosition:2
Entity Value: Jun. 30, 2016
EntityType:DATE
EntityPosition: 3
Resource: opportunities
Action: show
Context:""

In another example, the NLP input may be "show me current quarter top 5 sales opportunities." The NLP output may be a JSON object comprising the following information:

Original query: show me current quarter top 3 sales opportunities?
Returned query: show me top 3 sales opportunities from Jul. 1, 2016 to Sep. 30, 2016
EntityType:Integer
EntityValue: 3
EntityPosition:1
EntityType:DATE
EntityValue: 2016-07-01
EntityPosition:2
EntityValue: 2016-09-30
EntityType:DATE
EntityPosition:3
Resource: opportunities
Action: show
Context:""

Referring again to FIG. 5, in operation 506, the digital assistant services server 124 analyzes the plurality of elements associated with the query to determine an intent of the query. For example, the digital assistant services server 124 may map the plurality of elements associated with the query to a list of predetermined intents by comparing the plurality of elements to each intent in the list of predetermined intents to generate a score for each intent in the list of predetermined intents (e.g., based on how frequently each element appears in each predetermined intent). The list of predetermined intents may be stored in one or more databases 126. In operation 508, the digital assistant services server 124 generates a score for each intent in the list of predetermined intents.

Figure 8:
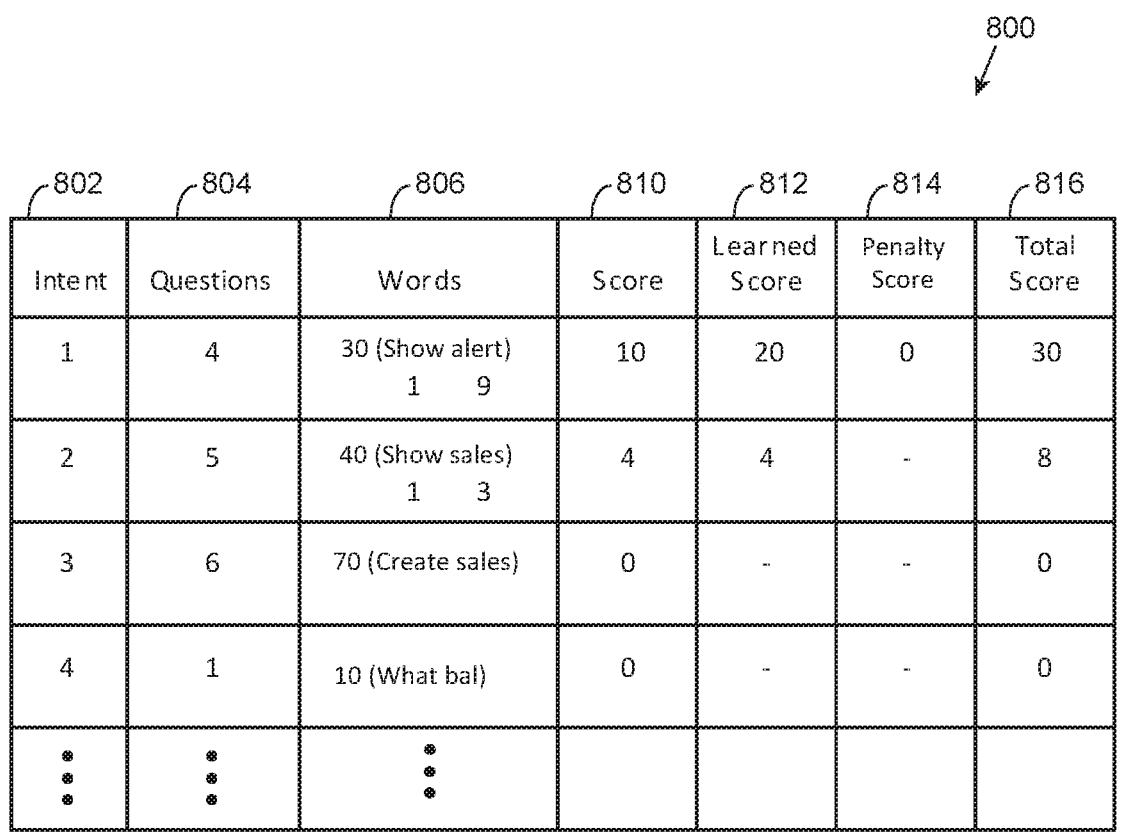
FIG. 8 illustrates an example diagram for generating a score for each intent in a list of predetermined intents, according to some example embodiments.

FIG. 8 illustrates an example diagram 800 for generating a score for each intent in the list of predetermined intents. The example diagram 800 shows a list of intents 802, a number of questions 804 associated with each intent, a number of words 806 in the questions 804, a score 810, a learned score 812, a penalty score 814, and a total score 816. Using the example query from above, "show alerts," the digital assistant services server 124 may compare each element (e.g., in this case using "show" and "alert" as elements) to the predetermined intents 802. For example, comparing the elements to the first intent may generate a score of 1 for the element "show" and a score of 9 for the element "alert" for a score 810 of 10. Then comparing the elements to the second intent may generate a score of 1 for show and 3 for sales for a score 810 of 4, and so forth. If the predetermined intent comprises a learned score 812 or a penalty score 814, those are also considered to determine a total score 816. For example, a learned score 812 may be added to a score 810 and a penalty score 814 may be subtracted from a score 810.

In operation 510, the digital assistant services server 124 determines a subset of the predetermined intents based on the score for each of the predetermined intents. In one example, the digital assistant services server 124 may determine the subset of predetermined intents based on the score for each intent by determining which of the predetermined intents comprise a score that is above a predetermined threshold score. In another example, the digital assistant services server 124 may determine a subset of predetermined intents by ranking the list of predetermined intents by the score generated for each intent and then selecting the top scoring predetermined intents. For example, the digital assistant services server 124 may select the top two or three scored predetermined intents (e.g., to provide the most relevant recommendations).

In operation 512, the digital assistant services server 124 provides recommendations related to the query from the user 106 based on the subset of predetermined intents. Using the example shown in FIG. 6, the digital assistant services server 124 may provide a response 606 with the recommendations "Show me my alerts or notifications," "Do I have any alerts or notifications," and "Show my recent opportunity."

Figure 9:
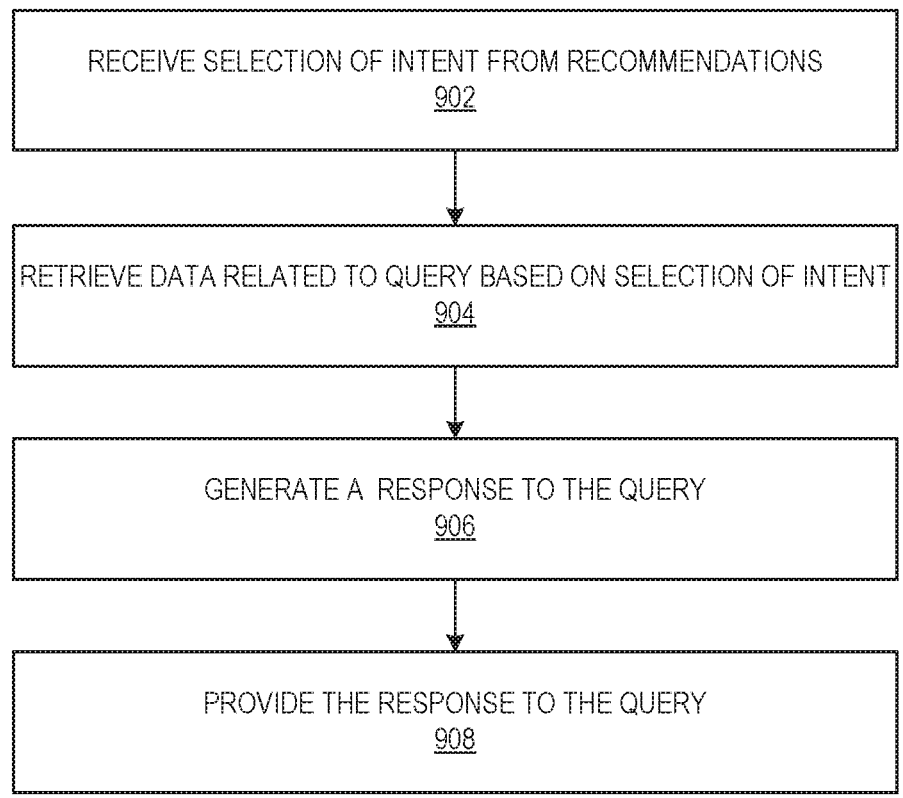
FIG. 9 is a flow chart illustrating aspects of a method, according to some example embodiments, for generating a response to a query.

FIG. 9 is a flow chart illustrating aspects of a method 900, according to some example embodiments, for generating a response to a query. For illustrative purposes, method 900 is described with respect to the networked system 100 of FIG. 1, It is to be understood that method 900 may be practiced with other system configurations in other embodiments.

In operation 902, the digital assistant services server 124 receives a selection of one intent of the subset of predetermined intents. Using the example in FIG. 6, the user 106 may select the recommendation "Show me my alerts or notifications." The computing device 110 may send the selection to the digital assistant services server 124. The digital assistant services server 124 may receive the selected intent and calculate a learned score for the selected intent. The digital assistant services server 124 may store the learned score for the selected intent. For example, the learned score may be associated with the selected intent as shown in FIG. 8 (e.g., as learned score 20 for intent 1), and stored in one or more databases 126. The digital assistant services server 124 may further calculate a total score 816 with the new learned score 812. The learned score may be associated with the user. In this way the server system 102 may learn from the user. The next time the user 106 inputs a similar query, the digital assistant services server 124 may determine the intent based on the learned score and not have to provide recommendations for the query again. For example, the digital assistant services server 124 may receive a similar query (e.g., a second query) from the user 106 via a computing device 110. As explained above, the digital assistant services server 124 may process the language in the second query to identify a plurality of elements associated with the query. The digital assistant services server 124 may then analyze the plurality of elements associated with the query to determine an intent of the query by mapping the plurality of elements associated with the query to a list of predetermined intents by comparing the plurality of elements associated with the query to each intent in the list of predetermined intents to generate a score for each intent in the list of predetermined intents. Since the second query is the same or similar to the first query "show alerts" described above, the digital assistant services server 124 will select the predetermined intent based on the learned score for the predetermined intent and generate a response to the second query, based on the selected predetermined intent.

The learned score may be associated with the user, an organization associated with the user, an entity associated with the user, the overall system, or some combination of these or other entities. In one example, the server system 102 may analyze learned scores at a user level, organization level, or entity level, to determine if the learned score should be elevated to another level (e.g., based on statistics associated with the predetermined intent, learned score, etc.). For example, the server system 102 may determine that 90% of users in a particular organization have a particular way of inputting a query. The server system 102 may automatically create a default intent for this query at the organizational level, or may provide a recommendation to an administrator associated with the organization to do so.

For example, the server system 102 may determine that many users associated with a particular organization are phrasing a query associated with a particular intent in the same or similar way by determining that the particular intent is associated with a high learned score for a plurality of users in the organization. Accordingly, the server system 102 may generate a learned score or default score for the particular intent and associate the learned score with an organization so that all the users may benefit from the knowledge. This may also be done based on the learned scored at an organization level to affect a learned score at an entity level, at an entity level to affect a score at a system level, and so forth.

In operation 904, the digital assistant services server 124 retrieves data related to the query based on the selection of intent of the subset of predetermined intents. In one example, the data related to the query may be retrieved by translating the query from the user 106 into a SQL statement, oData request, or other means, to retrieve the data. In one example, data may be retrieved from a number of different data sources and the data sources may comprise different formats for the data. In one example, the digital assistant services server 124 may transform the different formats of data from the different data sources into one data format.

In operation 906, the digital assistant services server 124 generates the response to the query and, in operation 908, the digital assistant services server 124 sends the response to the computing device 110 and the response is displayed to the user 106 (e.g., via a user interface displayed on the computing device 110).

In addition to learning the intent of a user query, the server system 102 may also "unlearn" an intent of a user query. For example, a user 106 may select a recommendation incorrectly or change the meaning behind a query. The user 106 may indicate that a predetermined intent is no longer accurate via a computing device 110 (e.g., via voice input, text input, via a settings menu item, etc.). The digital assistant services server 124 may receive the indication from the computing device that the predetermined intent is not accurate for the intent of the query, calculate a penalty score for the predetermined intent, and store the penalty score for the predetermined intent. For example, the digital assistant server 124 may associate the penalty score for the predetermined intent with the predetermined intent, which may be stored in one or more databases 126.

A penalty score may be associated with the user 106, an organization associated with the user 106, an entity associated with the user 106, as a system level penalty score, or some combination of these. Next time the user 106 inputs the query associated with the predetermined intent with the penalty score, the predetermined intent would not be automatically chosen to generate a response to the query.

During processing of a query, the server system 102 may determine that more information is needed to generate a response to the query. For example, the user 106 may not have provided enough information and further information may not be able to be ascertained from the information provided. Example embodiments provide dialog functionality to allow the server system 102 to get further information to generate a response to the query. For example, a user 106 may ask "Show me my sales contacts." The server system 102 may need the company name to generate a response to the question. The server system 102 may check to see if there are any system defaults or defaults associated with a user profile, organization profile, and so forth to see if it can determine the company name. If the server system 102 cannot determine the company name, it may ask the user 106 "For which company."

In another example, there may be a confidence score for when the server system 102 assumes the intent of the answer. For example, if a user 106 asks "what is the status of my order," the server system 102 may have a relatively low confidence score because the query could be interpreted in several different ways (e.g., production order, purchase order, etc.). The confidence score may be used for internal use to determine whether or not to ask follow up questions. For example, if a confidence score is above a certain threshold, the server system 102 may just answer the question based on the assumed intent and would not ask any follow up questions. If the confidence score is below a certain threshold, the server system 102 may ask one or more follow up questions to understand the intent.

In one example, the confidence score may also be used to give the user 106 an indication of the confidence of the answer. For example, the answer could appear to the user 106 in green for high confidence, yellow for medium confidence, and red for low confidence.

The server system 102 may use the score for the intent described earlier and determine the confidence based on whether the score for the intent is over or under a certain threshold. There may be more than one threshold. For example, there could be a threshold for a high confidence score (e.g., an intent score greater than 25), a threshold range for a medium confidence score (e.g., an intent score between 10 and 25), and a threshold for a low confidence score an intent score less than 10).

In addition to a query requesting various data (e.g., product information, sales information, company name and location, etc.), a user 106 may input a query that indicates that one or more operations be performed. For example, a user 106 may be having trouble with a particular product that he purchased. The user 106 may input a query that indicates that he is having trouble with the particular product (e.g., a television, printer, power drill, mobile device, etc.) and needs assistance. In one example, the server system 102 will create a dialog to ask follow up questions to get more information from the user 106 and also pull data from a knowledge source based on information input by the user 106. For example, the server system 102 may want to request the product model number, ask if the user 106 would like to register the product before creating a service ticket, and so forth. The server system 102 may ultimately create a service ticket to address the trouble with the particular product.

Figure 11:
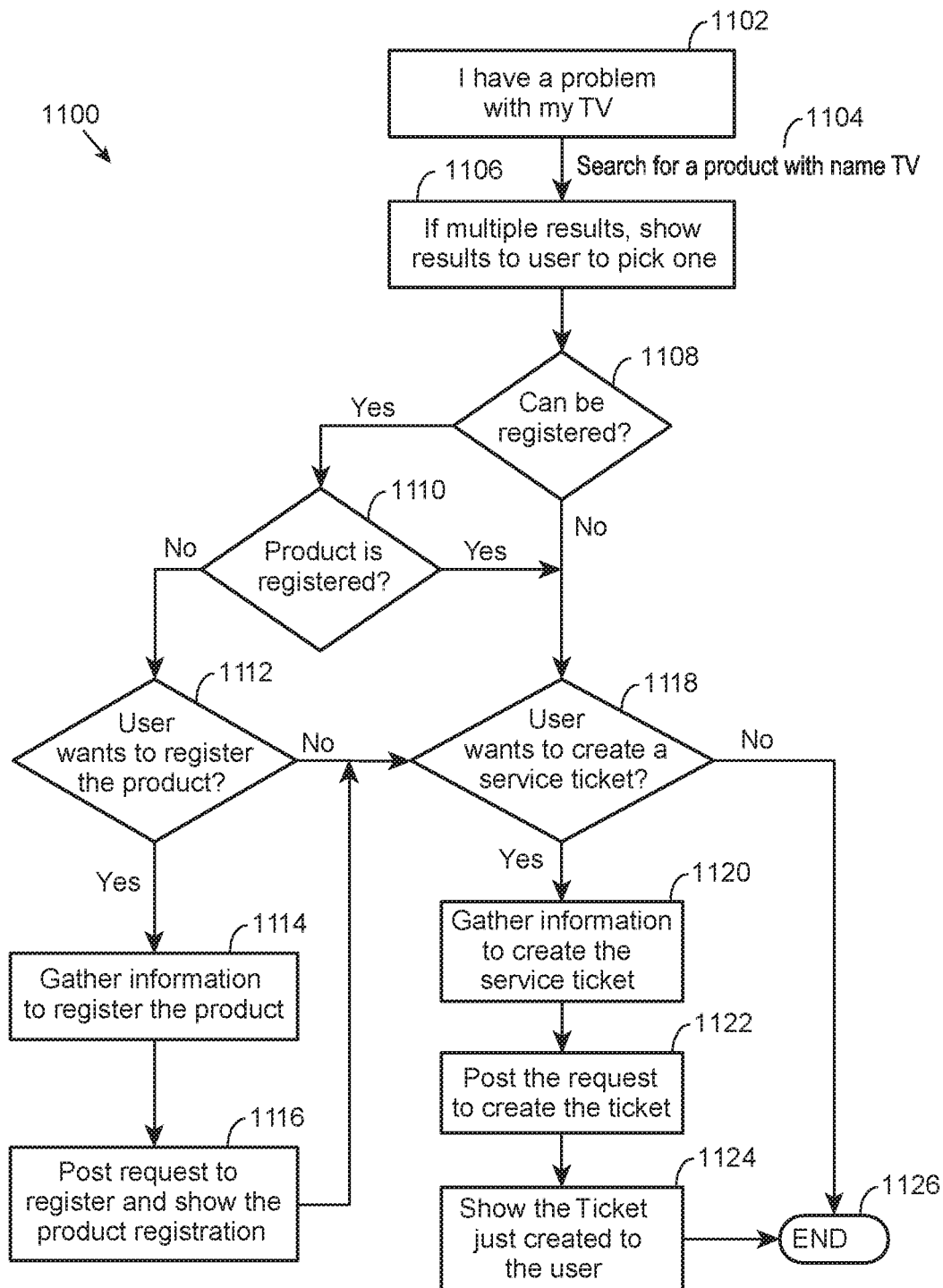
FIG. 11 illustrates an example state diagram, according to some example embodiments.

In one example, the server system 102 may utilize a plurality of use case state diagrams to create a dialog with the user 106 to get information to perform one or more operations associated with the query. Each use case state diagram may be associated with a particular use case and may comprise a plurality of nodes to be traversed to collect data and perform one or more operations. A simple example of a use case for creating a service ticket is shown in FIG. 11 and described in further detail below. The example use case state diagram in FIG. 11 comprises a plurality of nodes to generate data from the user or various sources.

In one example, each use case state diagram has one unique starting intent for the use case (e.g., a first or starting node in the state diagram). This may be a unique question with a unique intent identifier. In another example, each use case may have one or more ending intents e.g., one or more ending nodes for the state diagram).

In one example, the data needed for each node may be static or hard coded into the logic for each node. For example, if a user wants to register a product, the specific data that the system needs to collect may be predetermined. In one example, the data to be collected may be a user name and address, a user phone number and email, the date the user purchased the product, the product name and model number, and so forth.

In another example, the data to be collected for a particular node may be dynamic. For example, the logic for registering a product may be used for a plurality of entities, such as manufacturers of products, sellers of products, and so forth. The data to be collected for the dynamic node may be determined based on the product to be registered, the user, or other information. For example, the registration may be for a power drill from a first manufacturer. For registration, the first manufacturer may require the user contact information, product information, data of purchase, and a copy of the receipt. In another example, the registration may be for headphones from a second manufacturer. For registration, the second manufacturer may require the user contact information, product information, date of purchase, and merchant name where the user purchased the product. The server system 102 may have access to database tables or other storage structures that contain registration data for the first manufacturer and the second manufacturer. The server system 102 may access these tables to determine what information is contained in the table, and thus determine what data to request from the user or generate from other sources. The server system 102 may generate a data structure for the node containing the fields from the tables and then fill the fields with values from the data generated. This allows for a more efficient system since the server system 102 will not have to hard code what data it needs to collect for every single manufacturer, merchant, and so forth. This also allows for a more dynamic and flexible system since the server system 102 may not have to update the logic and structure for each node each time an entity changes its data, format of data, and so forth. Instead, the server system 102 may just determine the data needed from whatever is the latest data structure for the entity.

In another example, the server system 102 may allow switching between different use case state diagrams. For example, the user 106 may switch to a second use case diagram without finishing the first use case diagram. In another example, the user 106 may switch back to the first use case diagram after he is finished with the second use case diagram, or without finishing the second use case diagram. For example, for each query the server systems determines if the intent of the query matches an intent of a pending use case state diagram or a starting intent of a new use case state diagram that is not yet started. The values generated for each use case state diagram may be saved in memory until the particular use case has ended so that a user 106 may switch back and forth between use cases without having to start over or provide the same information again. Once the particular use case has ended, the generated values may be removed automatically.

Figure 10:
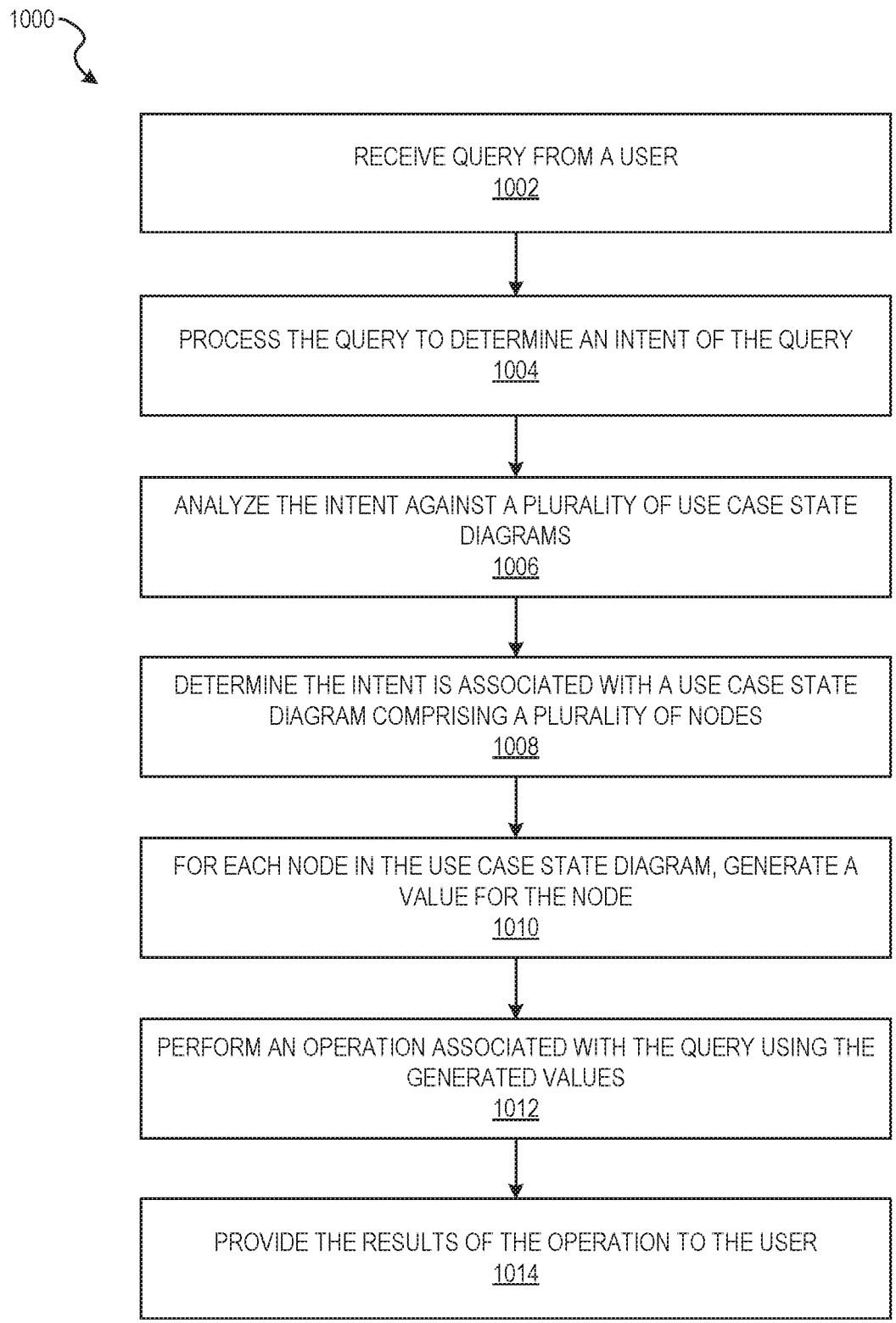
FIG. 10 is a flow chart illustrating aspects of a method, according to some example embodiments, for mapping a query intent to a state diagram for performing one or more operations associated with the query.

FIG. 10 is a flow chart illustrating aspects of a method 1000, according to some example embodiments, for mapping a query intent to a state diagram for performing one or more operations associated with the query. For illustrative purposes, method 1000 is described with respect to the networked system 100 of FIG. 1. It is to be understood that method 1000 may be practiced with other system configurations in other embodiments.

In operation 1002, the server system 102 (e.g., via digital assistant services server 124) receives a query input by a user 106 (e.g., via a computing device 110 as described above). In operation 1004, the digital assistant services server 124 processes the query to determine an intent of the query, as explained previously.

In operation 1006, the digital assistant services server 124 analyzes the intent of the query against a plurality of use case state diagrams. In one example, there may be a plurality of use case state diagrams associated with each of plurality of entities (e.g., companies or organizations). For example, a user or entity may create 20-30 use case state diagrams relevant to its business. In one example, the plurality of use case state diagrams model various dialog flows for various predetermined use cases. Each of these use cases may be modeled based on a particular query and intent and have an associated predetermined state diagram that comprises a plurality of nodes to traverse to satisfy the query. The predetermined state diagrams may be used to guide the user 106 and collect the relevant data to complete one or more operations or actions associated with the query. The digital assistant services server 124 may compare the intent of the query to each use case to determine if the intent is similar to a use case.

In one example, a node in the predetermined state diagram may be an intermediate node or a conditional node. An intermediate node may be a node that is associated with gathering particular data. For example, an intermediate node may be associated with a question "what is the model number of your product." The digital assistant services server 124 may determine the answer to this question based on data in prior nodes, data stored in one or more databases 126 internal or external to the server system 102, by requesting the data from the user 106, and so forth. A conditional node may be associated with a question that can branch out to other nodes depending on the user's answer. For example, an intermediate node may be associated with the question "do you want to register your product." If the user 106 responds with a "yes," then the state diagram branches in one direction (e.g., to follow nodes for registering the product); if the user 106 response with a "no," then the state diagram branches in another direction (e.g., to follow nodes to open a service ticket).

In operation 1008, the digital assistant services server 124 determines that the intent of the query is associated with a first use case state diagram of the plurality of predetermined use case diagrams. For example, the digital assistant services server 124 may map the intent to a plurality of use case state diagrams to find the use case state diagram that is associated with the query. The first use case diagram may comprise a plurality of nodes to traverse to satisfy the query. Each node may correspond to particular data that is needed to progress through the state diagram. Each node may comprise at least one key-value pair. Data determined at each node is stored as a value associated with a key. For example, a node may correspond to the question "do you want to register your product." In one example, the key may be "product registration" (e.g., the question or request for information associated with the node). The value may be "yes" or "no" depending on how the user 106 responds. In one example, each node may comprise a unique identifier to identify the node.

In this way the digital assistant services server 124 collects data at each node traversed. This data may be associated with a "context" whereby the data only persists in memory during the process of traversing the use case state diagram. For example, the data may be stored in volatile memory (e.g., random-access memory (RAM)), instead of permanent storage (e.g., a database) and automatically discarded once the use case state diagram is completed or a user 106 quits or closes an application associated with the use case state diagram. This provides the benefit of easier and faster access to data being collected, less storage space required in the system since the data is automatically discarded after the use case is complete, and allows the system to reuse data that the user 106 has already provided so it does not ask redundant questions of the user 106.

For each node in a flow of the use case state diagram, the digital assistant services server 124 generates a value for the node, as shown in operation 1010. In one example, the digital assistant services server 124 may determine whether data is available to determine the value for the node. For example, the digital assistant services server 124 may look for the value in previously generated values for nodes that were already traversed for information already retrieved by the digital assistant services server 124 or already provided by the user 106, or the digital assistant services server 124 may access one or more sources (e.g., one or more databases 126) to generate the value. Based on a determination that data is available to determine a value for the node, the digital assistant services server 124 may generate the value for the node based on the data and store the value in the key-value pair for the node.

In another example, the digital assistant services server 124 may determine that data is not available to determine a value for the node (e.g., from previously generate values) and may generate a request message to request data from the user 106. The user 106 may provide data in a response to the request (e.g., via a computing device 110). The digital assistant services server 124 may receive the data from the computing device 110, and store the value in the key-value pair for the node.

In operation 1012, the digital assistant services server 124 performs one or more operations associated with the query using the generated values (e.g., the key-value pairs for the plurality of nodes that contain generated values). For example, the digital assistant services server 124 may create a service ticket for an issue the user 106 is having with a particular product, based on the information ascertained by the digital assistant services server 124 and/or provided by the user 106 during traversal of the user case state diagram.

In operation 1014, the digital assistant services server 124 provides the results of the operation. For example, the digital assistant services server 124 may send the results to a computing device 110 to be displayed to a user 106. The generated values may be automatically deleted from memory after providing the results of the operation to the user 106. In one example, the digital assistant services server 124 may delete the generated values.

FIG. 11 illustrates an example state diagram 1100 for the use case to create a service ticket. In this example, a user 106 may input a query 1102, such as "I have a problem with my TV." There server system 102 (e.g., via digital assistant services server 124) may then search for a product with the name "TV" at operation 1104. For example, the digital assistant services server 124 may search one or more databases for this information. If the search results in multiple results, the digital assistant services server 124 may show the results to the user 106 to select the correct product, at node 1106. The digital assistant services server 124 may also, or in the alternative, ask the user 106 for further information, such as a product name, model number, type, and the like. The digital assistant services server 124 receives the product selection or additional information from the user 106.

At node 1108, the digital assistant services server 124 determines if the product may be registered. If the product may be registered, the digital assistant services server 124 determines whether the product is already registered in node 1110. If the digital assistant services server 124 determines that the product has not been registered, the digital assistant services server 124 askes the user 106 if he would like to register the product, in node 1112. If the digital assistant services server 124 receives an indication that the user 106 would like to register the product, in node 1114, the digital assistant services server 124 posts a request to register the product in node 1116. The digital assistant services server 124 may then provide the product registration details to the user 106, also at node 1116.

If the product has already been registered, if the user 106 does not want to register the product, or after the user 106 has registered the product, the digital assistant services server 124 continues to node 1118 to ask the user 106 if he would like to create a service ticket for the product. If the user 106 indicates that he does not wish to create a service ticket, the process ends at 1126. If the user 106 indicates that he would like to create a service ticket, the digital assistant services server 124 gathers information to create the service ticket at node 1120. For example, digital assistant services server 124 may request additional information from the user 106, gather information from product registration information, user data, and other sources, and so forth.

In node 1122, the digital assistant services server 124 posts a request to create the service ticket. In node 1124, the digital assistant services server 124 replies to the user 106 indicating that the service ticket has been created and may provide the details of the service ticket to the user 106. The process ends at 1126 and data for the use case state diagram may be deleted from memory.

Figure 12:
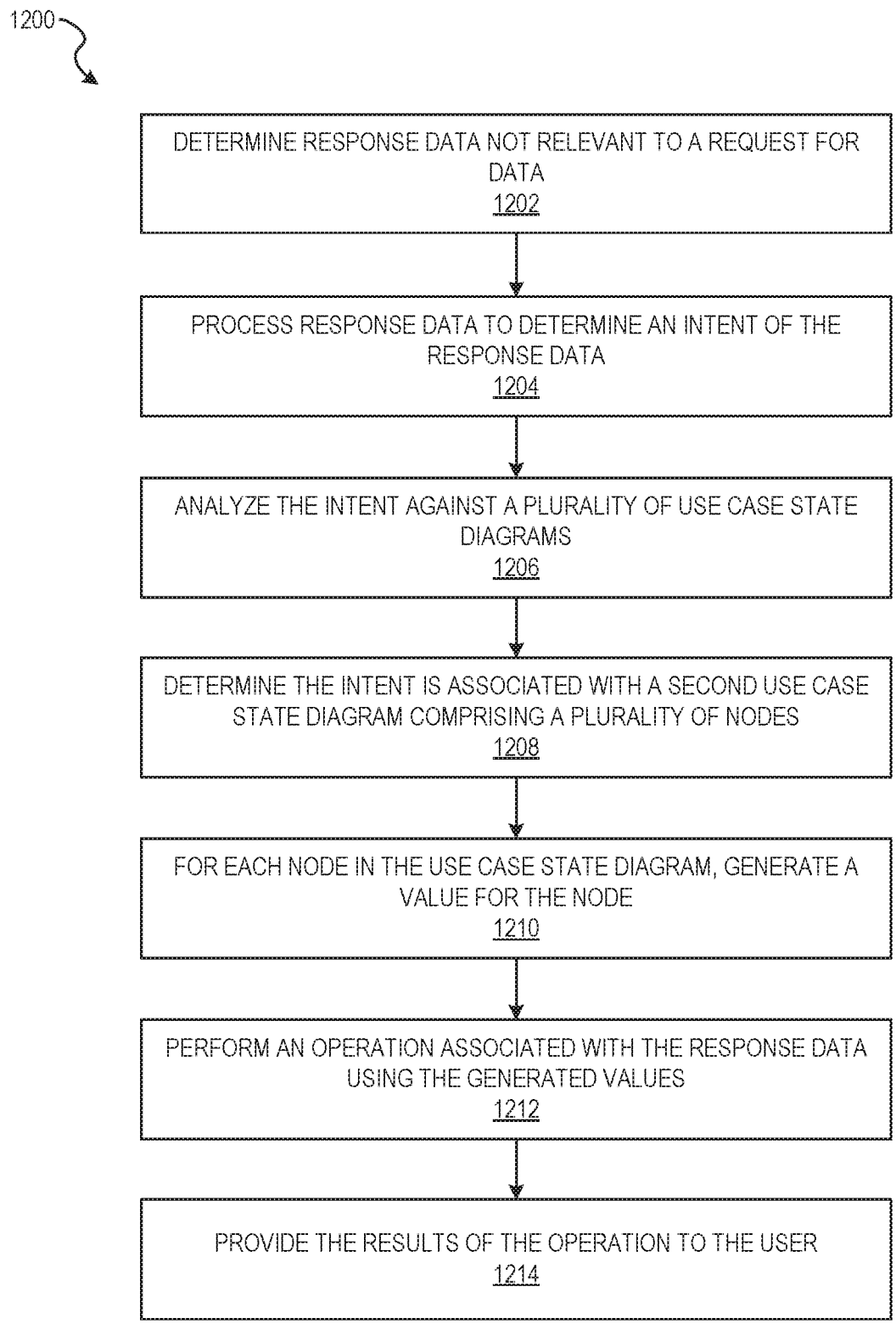
FIG. 12 is a flow chart illustrating aspects of a method, according to some example embodiments, for switching between use case state diagrams.

Example embodiments allow a user 106 to switch from one use case state diagram to another use case state diagram. FIG. 12 is a flow chart illustrating aspects of a method 1200, according to some example embodiments, for switching from a first use case state diagram to a second use case state diagram, before completing the first use case state diagram. For illustrative purposes, method 1200 is described with respect to the networked system 100 of FIG. 1. It is to be understood that method 1200 may be practiced with other system configurations in other embodiments.

In operation 1202, the digital assistant services server 124 determines that response data received from the user 106 in response to a request message requesting data, or generally input by the user 106, is not relevant to the request in the request message, or not relevant to the context of the use case state diagram. For example, the digital assistant services server 124 may be requesting information about registering a product from a user 106 and the user 106 may input "show me my vacation balance." Example embodiments allow a user 106 to switch between use cases and to come back from where the user 106 left off in a previous use case. In one example, the values generated in the first use case state diagram, before the user 106 switches, is still kept in memory (e.g., RAM) in case the user 106 returns to the state diagram.

The remainder of the flow chart in FIG. 12, related to response data received from a user 106, illustrates a similar process as the flow chart in FIG. 10 which is related to a query received from a user 106. Accordingly, the details included in the description of FIG. 10 apply to the flow illustrated in FIG. 12 and may not be repeated here.

In operation 1204, the digital assistant services server 124 processes the response data to determine an intent of the response data, as explained previously for determining an intent of a query. In operation 1206, the digital assistant services server 124 analyzes the intent of the response data against the plurality of predetermined use case state diagrams, and in operation 1208, the digital assistant services server 124 determines that the intent of the response data is associated with a second use case state diagram of the plurality of use case state diagrams, as also explained previously.

For each node in a flow of the use case state diagram, the digital assistant services server 124 generates a value for the node, as shown in operation 1210. In one example, the digital assistant services server 124 may determine whether data is available to determine the value for the node. For example, the digital assistant services server 124 may look for the value in previously generated values for nodes that were already traversed for information already retrieved by the digital assistant services server 124, already provided by the user 106, or available in one or more databases 126 or other sources. Based on a determination that data is available to determine a value for the node, the digital assistant services server 124 may generate the value for the node based on the data and store the value in the key-value pair for the node.

In another example, the digital assistant services server 124 may determine that data is not available to determine a value for the node (e.g., from previously generated values or other sources) and may generate a request message to request data from the user 106. The user 106 may provide data in a response to the request (e.g., via a computing device 110). The digital assistant services server 124 may receive the data from the computing device 110, and store the value in the key-value pair for the node.

In operation 1212, the digital assistant services server 124 performs one or more operations associated with the query, using the generated values (e.g., the key-value pairs for the plurality of nodes that contain generated values). For example, the digital assistant services server 124 may create a service ticket for an issue the user 106 is having with a particular product, based on the information ascertained by the digital assistant services server 124 and/or provided by the user 106, during traversal of the user case state diagram.

In operation 1214, the digital assistant services server 124 provides the results of the operation. For example, the digital assistant services server 124 may send the results to a computing device 110 to be displayed to a user 106. The generated values may be automatically deleted from memory after providing the results of the operation to the user 106.

Figure 13:
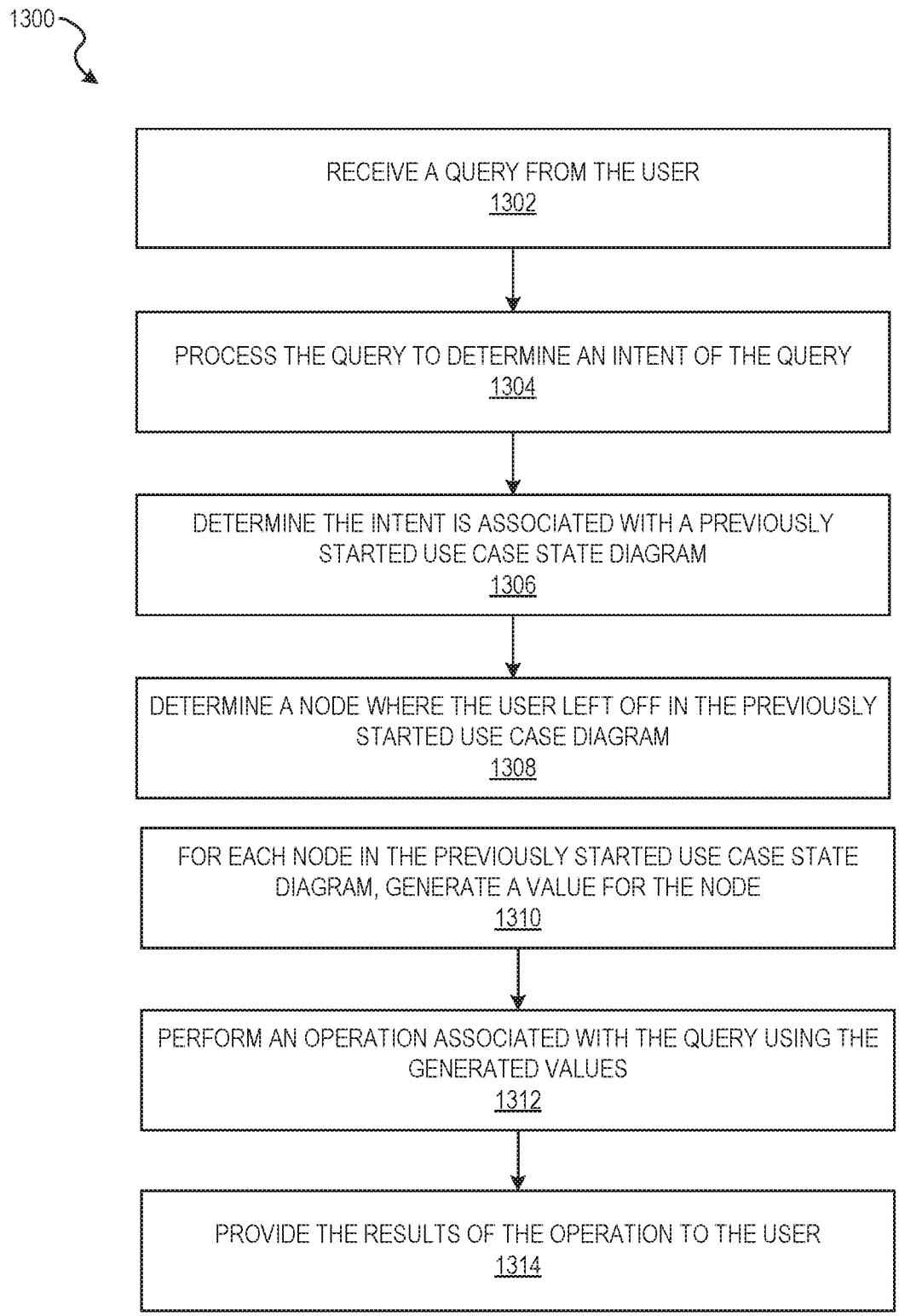
FIG. 13 is a flow chart illustrating aspects of a method, according to some example embodiments, for returning to a previously started use case state diagram.

Example embodiments allow a user 106 to switch from one use case state diagram to another use case state diagram, and then return to a previous use case state diagram. FIG. 13 is a flow chart illustrating aspects of a method 1300, according to some example embodiments, for returning to a previously started use case state diagram. For illustrative purposes, method 1300 is described with respect to the networked system 100 of FIG. 1. It is to be understood that method 1300 may be practiced with other system configurations in other embodiments.

In operation 1302, the digital assistant services server 124 receives a query (e.g., a new query or second query). Or, the digital assistant services server 124 may determine that response data received from the user 106 in response to a request message requesting data, or generally input by the user 106, is not relevant to the request in the request message, or not relevant to the context of the use case state diagram. For example, the digital assistant services server 124 may be requesting information about a vacation balance from a user 106 and the user 106 may input "I want to continue with product registration." Example embodiments allow a user 106 to switch between use cases and to come back from where the user 106 left, of in a previous use case.

The operations in the flow chart in FIG. 13 follow a similar process as the flow chart in FIG. 10. Accordingly, the details included in the description of FIG. 10 may apply to the flow illustrated in FIG. 13 but may not be repeated here.

In operation 1304, the digital assistant services server 124 processes the query to determine an intent of the query, as explained previously for determining an intent of a query. In operation 1306, the digital assistant services server 124 determines that the intent of the query is associated with a previously started use case state diagram. As explained above, the generated values for a plurality of nodes of the previously started use case diagram may continue to persist in memory until the use case state diagram is completed. The digital assistant services server 124 may first compare the intent of the query to any previously started use case diagrams to determine whether it is relevant to any of the previously started use case diagrams before comparing the intent of the query against the plurality of predetermined use case state diagrams.

In operation 1308, the digital assistant services server 124 determines a node where the user 106 left off in the previously started use case state diagram. In one example, the digital assistant services server 124 may determine the node where the user 106 left off by determining which node is the last node in a flow of nodes with generated values.

Continuing from the node where the user 106 left off, for each node in a flow of the use case state diagram, the digital assistant services server 124 generates a value for the node, as shown in operation 1310. In one example, the digital assistant services server 124 may determine whether data is available to determine the value for the node. For example, the digital assistant services server 124 may look for the value in previous generated values for nodes that were already traversed for information already retrieved by the digital assistant services server 124 or already provided by the user 106. Based on a determination that data is available to determine a value for the node, the digital assistant services server 124 may generate the value for the node based on the data and store the value in the key-value pair for the node.

In another example, the digital assistant services server 124 may determine that data is not available to determine a value for the node (e.g., from previously generated values) and may generate a request message to request data from the user 106. The user 106 may provide data in a response to the request (e.g., via a computing device 110). The digital assistant services server 124 may receive the data from the computing device 110 and store the value in the key-value pair for the node.

In operation 1312, the digital assistant services server 124 performs one or more operations associated with the query using the generated values (e.g., the key-value pairs for the plurality of nodes that contain generated values). For example, the digital assistant services server 124 may create a service ticket for an issue the user 106 is having with a particular product, based on the information ascertained by the digital assistant services server 124 and/or provided by the user 106, during traversal of the user 106 case state diagram.

In operation 1314, the digital assistant services server 124 provides the results of the operation. For example, the digital assistant services server 124 may send the results to a computing device 110 to be displayed to a user 106. The digital assistant services server 124 may delete the generated values from memory after providing the results of the operation to the user 106.

Digital assistant services may comprise logging services to log the user 106 dialog (e.g., user questions and responses) for sentiment analysis and machine learning. In one example, all of the dialog may be logged, and it may be queried for analytics and also serve as a machine learning tool for the system to give recommendation on the questions that do not match configured services. From the logged data, analytics may be performed to provide reporting and analysis for sentiment analysis, usage reports, and so forth.

As explained above, there may be many data sources for data used to generate a response to a query. These data sources may originate from a number of separate entities which may all comprise a number of different structures and formats for the data. There may be different structures and formats in each data source as well as across different data sources. For example, each entity may have different systems, such as ERP, human capital management (HCM), CRM, and other systems and they may have data in different formats such as in database tables, in a file system, as a service on the Internet, in a tree structure, as plain text or rich text, and so forth. One technical challenge with having many data sources with many different structures and formats for the data in the data sources, is how to provide and generate responses to queries to a variety of different channels and interfaces. For example, a user 106 may access digital assistant services using a client device 110 (e.g., personal computer, mobile phone, tablet, etc.) via one or more channels (also referent to herein as "interface type"), such as a web browser, a mobile app, an application, a chat bot (e.g., Slack, Facebook messenger, etc. via SMS, via email, via MMS, and the like.

One way to address the challenge of supporting multiple channel access to the digital assistant services may be to develop a separate implementation for each possible channel or user interface on each access channel. For example, a user interface layout may be designed for each separate user interface that maps to each type of data in each type of data source. This may take considerable development time and resources to support so many different channels. Moreover, data from different data sources may be needed to generate one or more responses.

Another way to address the challenge of supporting multiple channel access to the digital assistant services may be to format all of the data for all of the data sources in the exact same format and structure. Given the number of different entities and the vast amount of data available for each entity and data source, this is likely very impractical if not impossible.

Example embodiments described herein enable different channels to access the same set of data to provide responses to queries, regardless of the data source or format of the data. In one example, example embodiments provide an output to be able to display on all different channels already used by a user 106. Example embodiments may provide a service to be consumed by existing and new channels whereby the data sources are decoupled from the user interface (UI) for the channels.

In one example, the data from different data sources may be transformed into a single uniform data structure during runtime of the query response generation process. The single uniform data structure may be a predefined data structure or a protocol for a user interface (UI) associated with a channel to consume. In this way the single uniform data structure can be a service that may be used by any UI associated with a channel. The single uniform data structure may be a flexible data structure that can handle many formats of data. For example, the data from one or more data source may be in a list format, a map format, a single field, and embedded or tree structure, an XML format, and so forth, Using a single uniform data structure may allow for minimal development to support each type of interface associated with multiple channels to access the digital assistant services.

Figure 14:
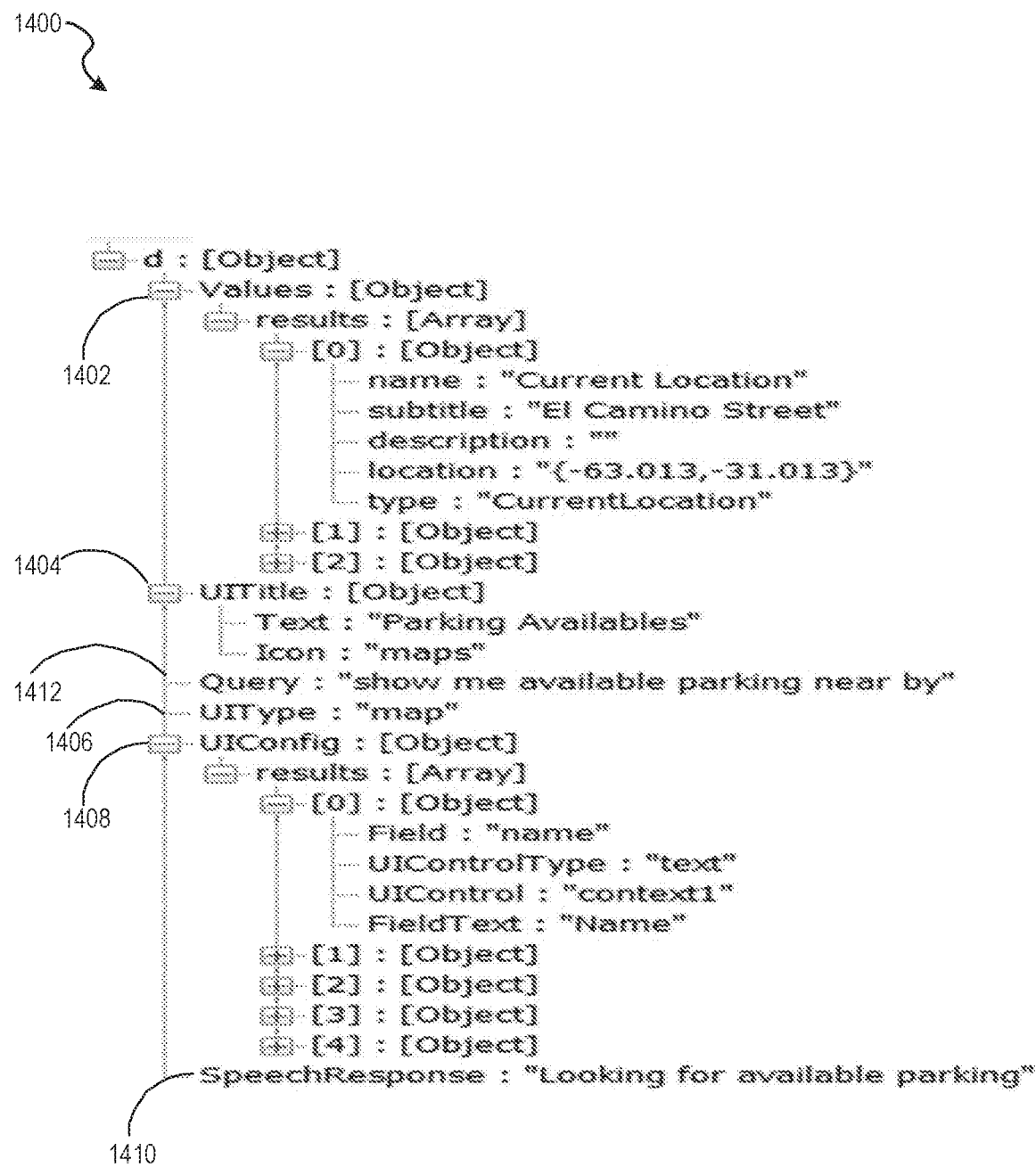
FIG. 14 is a diagram illustrating a uniform data structure, according to some example embodiments.

FIG. 14 illustrates an example of a single uniform data structure 1400, according to some example embodiments. The single uniform data structure 1400 may comprise various elements. For example, a values element 1402 may comprise a number of objects that are populated to include the actual data from one or more data sources. Each object may comprise a number of fields, such as name, subtitle, description, location, type, and the like. These fields may be populated with data from one or more data sources. In this example, the name field is populated with "Current Location," the subtitle field is populated with "El Camino Street," the description field is left blank, the location field is populated with a longitude and latitude of a particular location, and the type field is populated with "CurrentLocation."

The single uniform data structure 1400 may further comprise a UI title 1404 with a text field and an icon field. In this example the text field may be populated with "parking available" and the icon field may be populated with "maps." A query field 1412 may be populated with the query that was created by the user. In this example the query field is populated with "show me available parking nearby."

A UI type element 1406 may indicate a template type. Example embodiments may include predefined templates to instruct the UI how to render the particular data. In one example, a finite number of predefined templates may be used (e.g., 7, 10, etc.) to further simplify the implementation process and use of the service. For example there may be a template for displaying map data, a template for displaying a table or list, a template for displaying a table select (e.g., to display data to a user that may be selected by a user (e.g., include an interactive link) to get more information on various data displayed), a speech template for responding to the question in voice speech, a notification template that allows for push notifications (e.g., when a user first starts up the interface, etc.), and so forth. Each of the predefined templates may have the same single uniform data structure, no matter whether the template is for a map, a table, natural language speech, and so forth. In this way a uniform protocol between multiple channels to the service is established. Moreover this makes it easy for a UI to adapt to the service because of the simple uniform data structure and finite set of results templates.

The single uniform data structure 1400 may further comprise a UIConfig element 1408. This element may comprise metadata describing the data values for each object in the values element 1402. For example the metadata may describe each field, a field type for each field (e.g., text, integer, amount, currency, location), how to render the data, a hierarchy or sequence for rendering the data, and so forth. The metadata may be used by the UI to determine the type of data and how to display the data.

The single uniform data structure 1400 may further comprise a speech response 1410. In this example the speech response may be "Looking for available parking."

In one example, transformation rules may be used to define how to map data from one or more data sources to the uniform data structure. For example, the transformation rules may comprise instructions for translating the data from at least one data source to response data in the uniform data structure. In one example, transformation rules may be set up for each data source. There may be some predefined transformation rules to allow an entity or the server system 102 to design transformation rules for one or more data sources. Some examples of transformation rules may be to select certain fields or hide certain fields in a data source, add a field, change one or more field names, calculate or merge fields (e.g., amount and currency in one single field to display, or location longitude and latitude put in single field, etc.), map one field to another, and so forth. Transformation rules may be developed at design time so that the server system 102 may use them at runtime to transform data to the single uniform data structure to be consumed by one or more channels.

Figure 15:
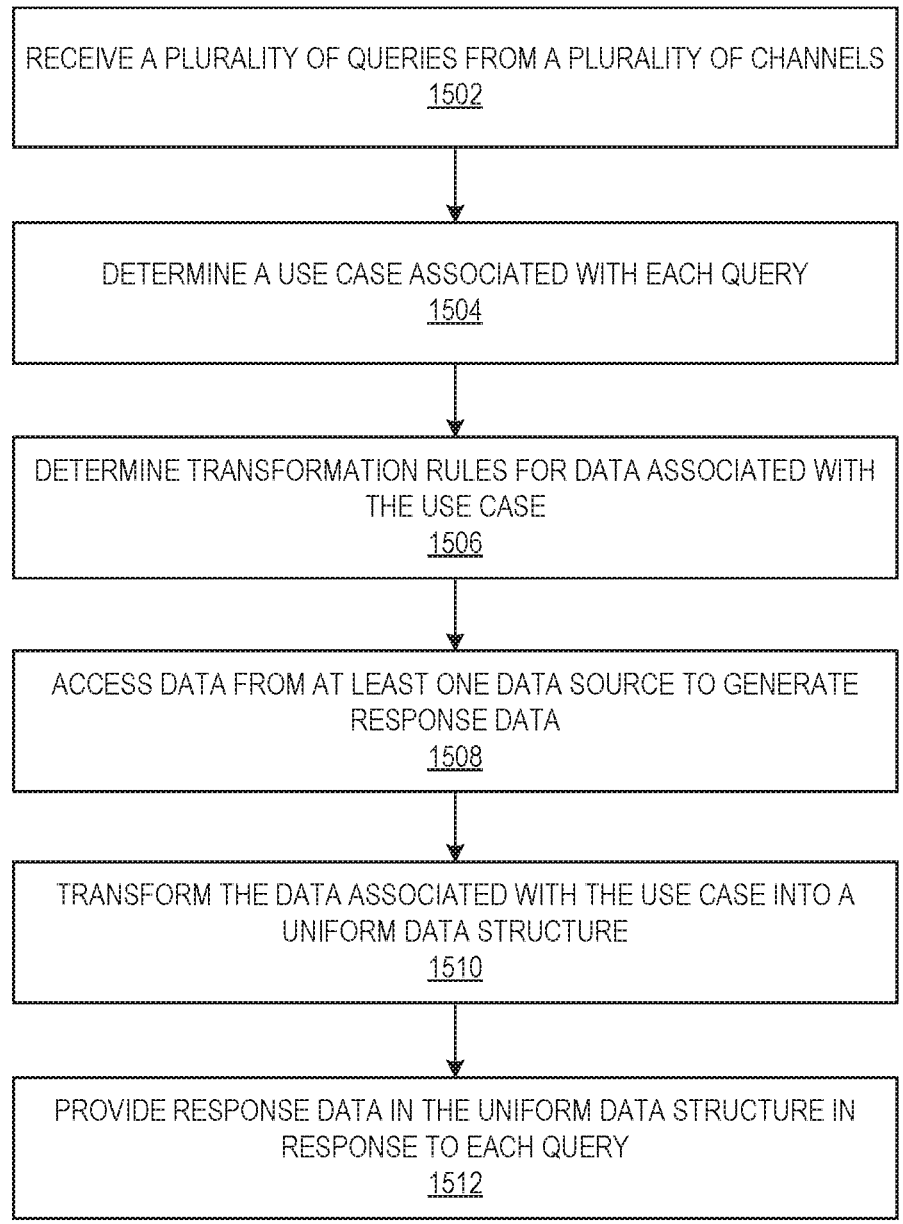
FIG. 15 is a flow chart illustrating aspects of a method, according to some example embodiments, for generating and providing data for a response to a query.

FIG. 15 is a flow chart illustrating aspects of a method 1500, according to some example embodiments, for generating and providing data for a response to a query. For illustrative purposes, method 1500 is described with respect to the networked system 100 of FIG. 1. It is to be understood that method 1500 may be practiced with other system configurations in other embodiments.

In operation 1502, the server system 102 (e.g., via digital assistant services server 124) receives a plurality of queries from a plurality of channels. For example the digital assistant services server 124 may receive a plurality of queries from a plurality of cannels via a plurality of computing devices 110. Each channel of the plurality of channels may comprise one of a plurality of different interface types, as explained above.

The digital assistant services server 124 processes each query. In operation 1504, the digital assistant services server 124 determines a use case associated with each query. For example, the digital assistant services server 124 may process the query to determine an intent of the query and determines a use case associated with the intent of the query from a plurality of use cases, as described in further detail above.

In operation 1506, the digital assistant services server 124 determines transformation rules for data associated with the use case. For example, transformation rules may be stored in one or more databases 126 and associated with the plurality of use cases. The digital assistant services server 124 may access the one or more databases 126 to determine what transformation rules are associated with the use case for the query.

In operation 1508, the digital assistant services server 124 may access data from at least one data source of a plurality of data sources to generate response data for a response to the query. The plurality of data sources may comprise data in a plurality of different formats, as explained above.

In operation 1510, the digital assistant services server 124 transforms the data associated with the use case from at least a first format into a uniform data structure comprising the response data using the transformation rules. For example the digital assistant services server 124 may use the transformation rules to change one or more field names in the data, merge one or more fields in the data, calculate values for certain fields based on multiple fields in the data, and so forth.

In operation 1512, the digital assistant services server 124 provides the response data in the uniform data structure to the computing device to be rendered in a user interface. For example, the digital assistant services server 124 sends the response data in the uniform data structure to the computing device. The computing device may then render the response data in a user interface for a user 106. To render the response data, the computing device may loop through each element in the metadata associated with each value of the response data to display the response data according to the metadata.

The following examples describe various embodiments of methods, machine-readable media, and systems (e.g., machines, devices, or other apparatus) discussed herein.

Example 1

A method comprising:
receiving, at a server computer, a plurality of queries from plurality of channels via a plurality of computing devices, each channel of the plurality of channels comprising one of a plurality of different interface types;
for each query of the plurality of queries:
determining, by the server computer, a use case associated with the query from a plurality of predetermined use cases;
determining, by the server computer, transformation rules for data associated with the use case;
accessing, by the server computer, data from at least one data source of a plurality of data sources to generate response data for a response to the query, the plurality of data sources comprising the data in a plurality of different data formats;
transforming, by the server computer, the data associated with the use case from at least a first format into a uniform data structure comprising the response data using the transformation rules for the response data; and
providing the response data in the uniform data structure to the computing device to be rendered in a user interface.

Example 2

A method according to any of the previous examples, wherein the uniform data structure comprises fields for values associated with the response data, metadata associated with each of the values, and a template type.

Example 3

A method according to any of the previous examples, wherein the response data is rendered in the user interface by looping through each element in the metadata to display the response data according to the metadata.

Example 4

A method according to any of the previous examples, wherein the uniform data structure is associated with one of a plurality of templates.

Example 5

A method according to any of the previous examples, wherein an interface type comprises one of a group comprising: a web browser, a mobile app, an application, a chat hot, email, instant message, SMS, and MMS.

Example 6

A method according to any of the previous examples, wherein determining a use case associated with the query comprises:
processing the query to determine an intent of the query; and
determining a use case associated with the intent of the query from a plurality of use cases.

Example 7

A method according to any of the previous examples, wherein transformation rules comprise instructions for translating the data from the at least one data source to response data in the uniform data structure.

Example 8

A method according to any of the previous examples, wherein a data format comprises one of a group comprising: XML, a table, an embedded tree structure, file system, plain text, and rich text.

Example 9

A server computer comprising:
at least one processor; and
a computer-readable medium coupled with the at least one processor, the computer-readable medium comprising instructions stored thereon that are executable by the at least one processor to cause the server computer to perform operations comprising:
receiving a plurality of queries from plurality of channels via a plurality of computing devices, each channel of the plurality of channels comprising one of a plurality of different interface types;
for each query of the plurality of queries:
determining a use case associated with the query from a plurality of predetermined use cases;
determining transformation rules for data associated with the use case;
accessing data from at least one data source of a plurality of data sources to generate response data for a response to the query, the plurality of data sources comprising the data in a plurality of different data formats;
transforming the data associated with the use case from at least a first format into a uniform data structure comprising the response data using the transformation rules for the response data; and
providing the response data in the uniform data structure to the computing device to be rendered in a user interface.

Example 10

A server computer according to any of the previous examples, wherein the uniform data structure comprises fields for values associated with the response data, metadata associated with each of the values, and a template type.

Example 11

A server computer according to any of the previous examples, wherein the response data is rendered in the user interface by looping through each element in the metadata to display the response data according to the metadata.

Example 12

A server computer according to any of the previous examples, wherein the uniform data structure is associated with one of a plurality of templates.

Example 13

A server computer according to any of the previous examples, wherein an interface type comprises one of a group comprising: a web browser, a mobile app, an application, a chat bot, email, instant message, SMS, and MMS.

Example 14

A server computer according to any of the previous examples, wherein determining a use case associated with the query comprises:
processing the query to determine an intent of the query; and
determining a use case associated with the intent of the query from a plurality of use cases.

Example 15

A server computer according to any of the previous examples; wherein transformation rules comprise instructions for translating the data from the at least one data source to response data in the uniform data structure.

Example 16

A server computer according to any of the previous examples, wherein a data format comprises one of a group comprising: XML, a table, an embedded tree structure, file system; plain text, and rich text.

Example 17

A non-transitory computer-readable medium comprising instructions stored thereon that are executable by at least one processor to cause a computing device to perform operations comprising:
receiving a plurality of queries from plurality of channels via a plurality of computing devices, each channel of the plurality of channels comprising one of a plurality of different interface types;
for each query of the plurality of queries:
determining a use case associated with the query from a plurality of predetermined use cases;
determining transformation rules for data associated with the use case;
accessing data from at least one data source of a plurality of data sources to generate response data for a response to the query, the plurality of data sources comprising the data in a plurality of different data formats;
transforming the data associated with the use case from at least a first format into a uniform data structure comprising the response data using the transformation rules for the response data; and providing the response data in the uniform data structure to the computing device to be rendered in a user interface.

Example 18

A non-transitory computer-readable medium according to any of the previous examples, wherein the uniform data structure comprises fields for values associated with the response data, metadata associated with each of the values, and a template type.

Example 19

A non-transitory computer-readable medium according to any of the previous examples, wherein the response data is rendered in the user interface by looping through each element in the metadata to display the response data according to the metadata.

Example 20

A non-transitory computer-readable medium according to any of the previous examples, wherein transformation rules comprise instructions for translating the data from the at least one data source to response data the uniform data structure.

Figure 16:
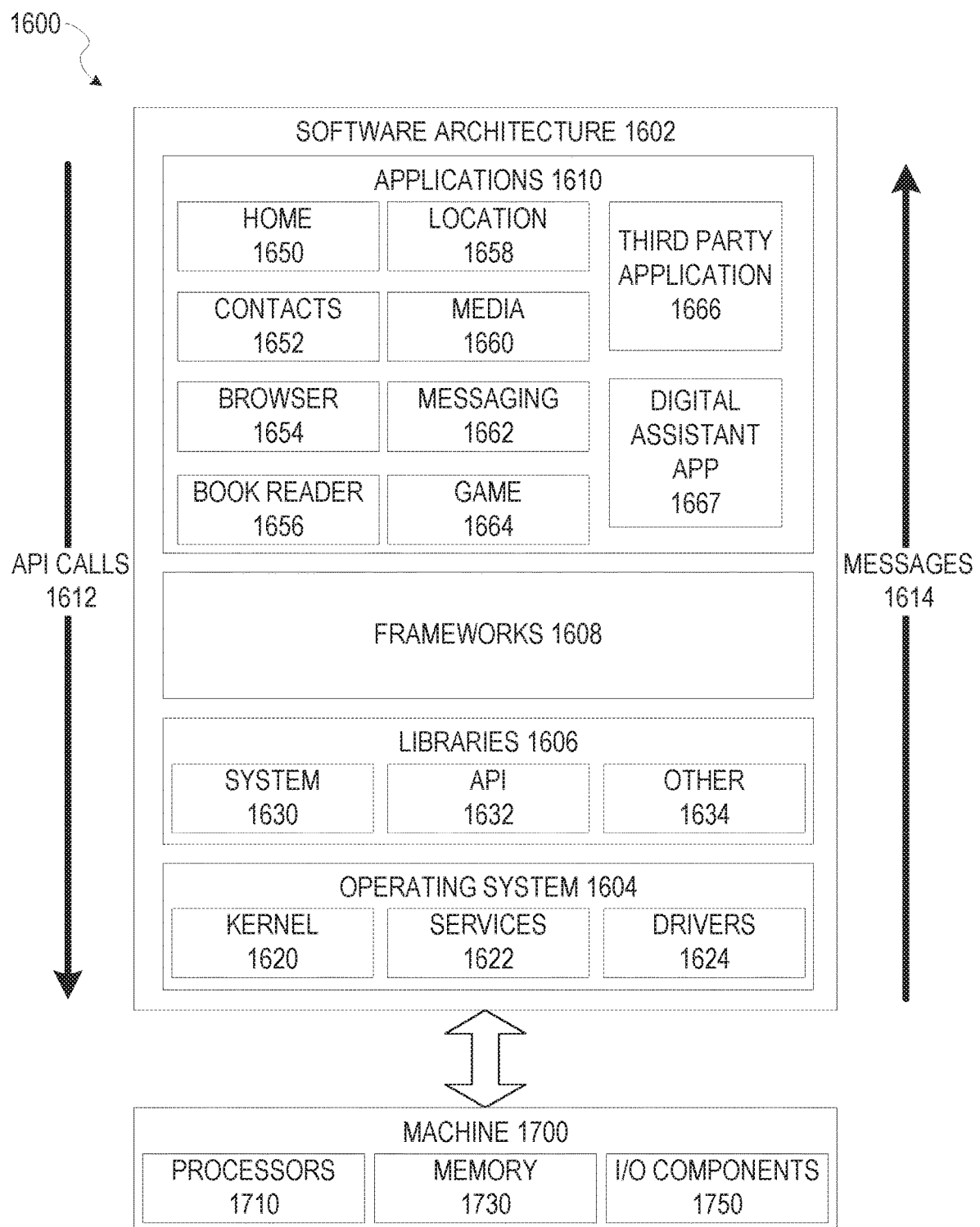
FIG. 16 is a block diagram illustrating an example of a software architecture that may be installed on a machine, according to some example embodiments.

FIG. 16 is a block diagram 1600 illustrating software architecture 1602, which can be installed on any one or more of the devices described above. For example, in various embodiments, client devices 110 and server systems 130, 102, 120, 122, and 124 may be implemented using some or all of the elements of software architecture 1602. FIG. 16 is merely a non-limiting example of a software architecture, and it will be appreciated that many other architectures can be implemented to facilitate the functionality described herein. In various embodiments, the software architecture 1602 is implemented by hardware such as machine 1700 of FIG. 17 that includes processors 1710, memory 1730, and I/O components 1750. In this example, the software architecture 1602 can be conceptualized as a stack of layers where each layer may provide a particular functionality. For example, the software architecture 1602 includes layers such as an operating system 1604, libraries 1606, frameworks 1608, and applications 1610. Operationally, the applications 1610 invoke application programming interface (API) calls 1612 through the software stack and receive messages 1614 in response to the API calls 1612, consistent with some embodiments.

In various implementations, the operating system 1604 manages hardware resources and provides common services. The operating system 1604 includes, for example, a kernel 1620, services 1622, and drivers 1624. The kernel 1620 acts as an abstraction layer between the hardware and the other software layers, consistent with some embodiments. For example, the kernel 1620 provides memory management, processor management (e.g., scheduling), component management, networking, and security settings, among other functionality. The services 1622 can provide other common services for the other software layers. The drivers 1624 are responsible for controlling or interfacing with the underlying hardware, according to some embodiments. For instance, the drivers 1624 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 1606 provide a low-level common infrastructure utilized by the applications 1610. The libraries 1606 can include system libraries 1630 (e.g., C standard library) that can provide functions such as memory allocation functions, string manipulation functions, mathematic functions, and the like. In addition, the libraries 1606 can include API libraries 1632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and in three dimensions (3D) graphic content on a display), database libraries (e.g., SQLite to provide various relational database functions), web libraries (e.g., WebKit to provide web browsing functionality), and the like. The libraries 1606 can also include a wide variety of other libraries 1634 to provide many other APIs to the applications 1610.

The frameworks 1608 provide a high-level common infrastructure that can be utilized by the applications 1610, according to some embodiments. For example, the frameworks 1608 provide various graphic user interface (GUI) functions, high-level resource management, high-level location services, and so forth. The frameworks 1608 can provide a broad spectrum of other APIs that can be utilized by the applications 1610, some of which may be specific to a particular operating system 1604 or platform.

In an example embodiment, the applications 1610 include a home application 1650, a contacts application 1652, a browser application 1654, a book reader application 1656, a location application 1658, a media application 1660, a messaging application 1662, a game application 1664, and a broad assortment of other applications such as a third party applications 1666. According to some embodiments, the applications 1610 are programs that execute functions defined in the programs. Various programming languages can be employed to create one or more of the applications 1610, structured in a variety of manners, such as object-oriented programming languages (e.g., Objective-C, Java, or C++) or procedural programming languages (e.g., C or assembly language). In a specific example, the third party application 1666 (e.g., an application developed using the ANDROID™ or IOS™ software development kit (SDK) by an entity other than the vendor of the particular platform) may be mobile software running on a mobile operating system such as IOS™ ANDROID™, WINDOWS® Phone, or another mobile operating system. In this example, the third party application 1666 can invoke the API calls 1612 provided by the operating system 1604 to facilitate functionality described herein.

Some embodiments may particularly include a digital assistant application 1667. In certain embodiments, this may be a stand-alone application that operates to manage communications with a server system such as third party servers 130 or server system 102. In other embodiments, this functionality may be integrated with another application. The digital assistant application 1667 may request and display various data related to ERP or other systems and may provide the capability for a user 106 to input data related to the system via voice, a touch interface, a keyboard, or using a camera device of machine 1700, communication with a server system via I/O components 1750, and receipt and storage of object data in memory 1730. Presentation of information and user inputs associated with the information may be managed by digital assistant application 1667 using different frameworks 1608, library 1606 elements, or operating system 1604 elements operating on a machine 1700.

Figure 17:
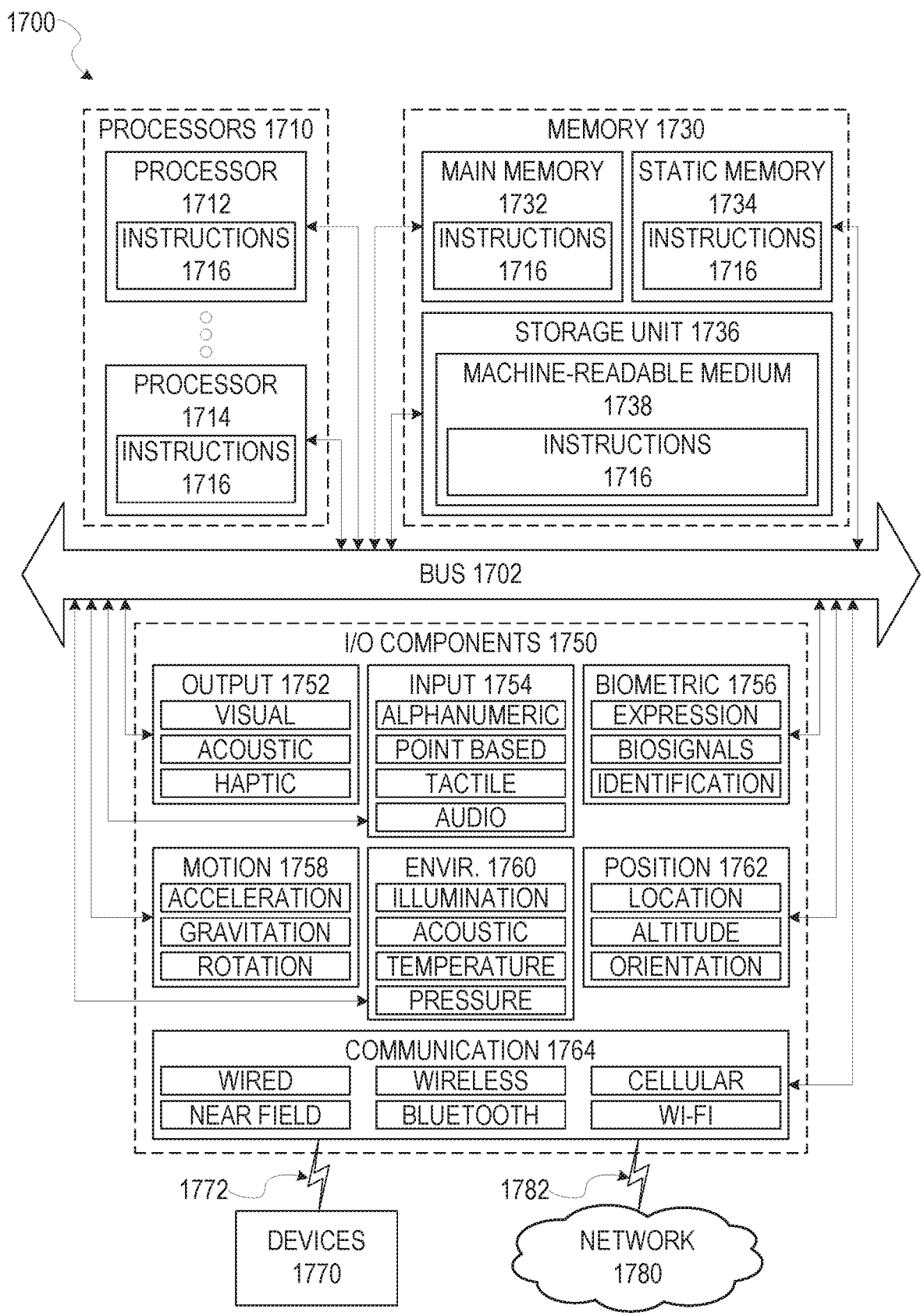
FIG. 17 illustrates a diagrammatic representation of a machine, in the form of a computer system, within which a set of instructions may be executed for causing the machine to perform any one or more of the methodologies discussed herein, according to an example embodiment.

FIG. 17 is a block diagram illustrating components of a machine 1700, according to some embodiments, able to read instructions from a machine-readable medium (e.g., a machine-readable storage medium) and perform any one or more of the methodologies discussed herein. Specifically, FIG. 17 shows a diagrammatic representation of the machine 1700 in the example form of a computer system, within which instructions 1716 (e.g., software, a program, an application 1610, an applet, an app, or other executable code) for causing the machine 1700 to perform any one or more of the methodologies discussed herein can be executed. In alternative embodiments, the machine 1700 operates as a standalone device or can be coupled (e.g., networked) to other machines. In a networked deployment, the machine 1700 may operate in the capacity of a server machine 130, 102, 120, 122, 124, etc., or a client device 110 in a server-client network environment, or as a peer machine in a peer-to-peer (or distributed) network environment. The machine 1700 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1716, sequentially or otherwise, that specify actions to be taken by the machine 1700. Further, while only a single machine 1700 is illustrated, the term "machine" shall also be taken to include a collection of machines 1700 that individually or jointly execute the instructions 1716 to perform any one or more of the methodologies discussed herein.

In various embodiments, the machine 1700 comprises processors 1710, memory 1730, and I/O components 1750, which can be configured to communicate with each other via a bus 1702. In an example embodiment, the processors 1710 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 1712 and a processor 1714 that may execute the instructions 1716. The term "processor" is intended to include multi-core processors 1710 that may comprise two or more independent processors 1712, 1714 (also referred to as "cores") that can execute instructions 1716 contemporaneously. Although FIG. 17 shows multiple processors 1710, the machine 1700 may include a single processor 1710 with a single core, a single processor 1710 with multiple cores (e.g., a multi-core processor 1710), multiple processors 1712, 1714 with a single core, multiple processors 1712, 1714 with multiples cores, or any combination thereof.

The memory 1730 comprises a main memory 1732, a static memory 1734, and a storage unit 1736 accessible to the processors 1710 via the bus 1702, according to some embodiments. The storage unit 1736 can include a machine-readable medium 1738 on which are stored the instructions 1716 embodying any one or more of the methodologies or functions described herein. The instructions 1716 can also reside, completely or at least partially, within the main memory 1732, within the static memory 1734, within at least one of the processors 1710 (e.g., within the processor's cache memory), or any suitable combination thereof, during execution thereof by the machine 1700. Accordingly, in various embodiments, the main memory 1732, the static memory 1734, and the processors 1710 are considered machine-readable media 1738.

As used herein, the term "memory" refers to a machine-readable medium 1738 able to store data temporarily or permanently and may be taken to include, but not be limited to, random-access memory (RAM), read-only memory (ROM), buffer memory, flash memory, and cache memory. While the machine-readable medium 1738 is shown, in an example embodiment, to be a single medium, the term "machine-readable medium" should be taken to include a single medium or multiple media (e.g., a centralized or distributed database, or associated caches and servers) able to store the instructions 1716. The term "machine-readable medium" shall also be taken to include any medium, or combination of multiple media, that is capable of storing instructions (e.g., instructions 1716) for execution by a machine (e.g., machine 1700), such that the instructions 1716, when executed by one or more processors of the machine 1700 (e.g., processors 1710), cause the machine 1700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1750 include a wide variety of components to receive input, provide output, produce output, transmit information, exchange information, capture measurements, and so on. In general, it will be appreciated that the I/O components 1750 can include many other components that are not shown in FIG. 17. The I/O components 1750 are grouped according to functionality merely for simplifying the following discussion, and the grouping is in no way limiting. In various example embodiments, the I/O components 1750 include output components 1752 and input components 1754. The output components 1752 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1754 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1750 include biometric components 1756, motion components 1758, environmental components 1760, or position components 1762, among a wide array of other components. For example, the biometric components 1756 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1758 include acceleration sensor components (e.g., accelerometer), gravitation sensor components, rotation sensor components (e.g., gyroscope), and so forth. The environmental components 1760 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1762 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1750 may include communication components 1764 operable to couple the machine 1700 to a network 1780 or devices 1770 via a coupling 1782 and a coupling 1772, respectively. For example, the communication components 1764 include a network interface component or another suitable device to interface with the network 1780. In further examples, communication components 1764 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1770 may be another machine 1700 or any of a wide variety of peripheral devices (e.g., a peripheral device coupled via a Universal Serial Bus (USB)).

Moreover, in some embodiments, the communication components 1764 detect identifiers or include components operable to detect identifiers. For example, the communication components 1764 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1764, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 1780 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1780 or a portion of the network 1780 may include a wireless or cellular network, and the coupling 1782 may be a Code Division Multiple Access (CDMA) connection, a Global System for Mobile communications (GSM) connection, or another type of cellular or wireless coupling. In this example, the coupling 1782 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1716 are transmitted or received over the network 1780 using a transmission medium via a network interface device (e.g., a network interface component included in the communication components 1764) and utilizing any one of a number of well-known transfer protocols (e.g., Hypertext Transfer Protocol (HTTP)). Similarly, in other example embodiments, the instructions 1716 are transmitted or received using a transmission medium via the coupling 1772 (e.g., a peer-to-peer coupling) to the devices 1770. The term "transmission medium" shall be taken to include any intangible medium that is capable of storing, encoding, or carrying the instructions 1716 for execution by the machine 1700, and includes digital or analog communications signals or other intangible media to facilitate communication of such software.

Furthermore, the machine-readable medium 1738 is non-transitory (in other words, not having any transitory signals) in that it does not embody a propagating signal. However, labeling the machine-readable medium 1738 "non-transitory" should not be construed to mean that the medium is incapable of movement; the medium 1738 should be considered as being transportable from one physical location to another. Additionally, since the machine-readable medium 1738 is tangible, the medium 1738 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   determining, by a server computer, a first use case state diagram, of a plurality of use case state diagrams, associated with a first query received via a computing device, the first use case state diagram comprising a plurality of nodes to traverse to satisfy a query;
   traversing, by the server computer, the first use case state diagram to determine data from one or more data sources to be used to generate a response to the first query;
   during traversal of the first use case state diagram, receiving response data in response to data requested from the computing device;
   determining that the response data is a second query corresponding to a second use case state diagram of the plurality of use case state diagrams;
   traversing the second use case state diagram to provide a response to the second query;
   receiving a third query from the computing device;
   determining that the third query corresponds to the first use case state diagram, wherein generated values for a plurality of nodes of the first use case state diagram continue to persist in memory;
   continuing traversing the first use case state diagram, from a node where traversal stopped when the second query was received, to determine data from one or more data sources to be used to generate the response to the first query;
   transforming, by the server computer, the data for the response to the first query from at least a first format into a single uniform data structure based on transformation rules corresponding to the one or more data sources, the single uniform data structure further comprising a query data field and a user interface type data field;
   populating the query data field of the single uniform data structure with text of the first query;
   populating the user interface type data field with a value indicating instructions for rendering the data one or more data fields of the single uniform data structure; and providing the single uniform data structure to the computing device to be rendered in a user interface as a response to the first query according to instructions of the user interface type data field of the single uniform data structure.

2. The method of claim 1, wherein the single uniform data structure further comprises a plurality of other data fields and metadata associated with each of the plurality of other data fields and wherein the response data is rendered in the user interface by looping through each element in the metadata to display the response data according to the metadata.

3. The method of claim 1, wherein an interface type comprises one of a group comprising: a web browser, a mobile app, an application, a chat bot, email, instant message, SMS, and MMS.

4. The method of claim 1, wherein determining the first use case state diagram associated with the first query comprises:
processing the first query to determine an intent of the first query;
determining a use case associated with the intent of the first query from the plurality of predetermined use cases; and
determining the first user case state diagram corresponding to the first use case.

5. The method of claim 1, wherein transformation rules comprise instructions for translating the data from the at least one data source to response data in the uniform data structure.

6. The method of claim 1, wherein a data format comprises one of a group comprising: XML, a table, an embedded tree structure, file system, plain text, and rich text.

7. A server computer comprising:
at least one processor; and
a computer-readable medium coupled with the at least one processor, the computer-readable medium comprising instructions stored thereon that are executable by the at least one processor to cause the server computer to perform operations comprising:
determining a first use case state diagram, of a plurality of use case state diagrams, associated with a first query received via a computing device, the first use case state diagram comprising a plurality of nodes to traverse to satisfy a query;
traversing the first use case state diagram to determine data from one or more data sources to be used to generate a response to the first query;
during traversal of the first use case state diagram, receiving response data in response to data requested from the computing device;
determining that the response data is a second query corresponding to a second use case state diagram of the plurality of use case state diagrams;
traversing the second use case state diagram to provide a response to the second query;
receiving a third query from the computing device;
determining that the third query corresponds to the first use case state diagram, wherein generated values for a plurality of nodes of the first use case state diagram continue to persist in memory;
continuing traversing the first use case state diagram, from a node where traversal stopped when the second query was received, to determine data from one or more data sources to be used to generate the response to the first query;
transforming the data for the response to the first query from at least a first format into a single uniform data structure based on transformation rules corresponding to the one or more data sources, the single uniform data structure further comprising a query data field and a user interface type data field;
populating the query data field of the single uniform data structure with text of the first query;
populating the user interface type data field with a value indicating instructions for rendering the data one or more data fields of the single uniform data structure; and
providing the single uniform data structure to the computing device to be rendered in a user interface as a response to the first query according to instructions of the user interface type data field of the single uniform data structure.

8. The server computer of claim 7, wherein an interface type comprises one of a group comprising: a web browser, a mobile app, an application, a chat bot, email, instant message, SMS, and MMS.

9. The server computer of claim 7, wherein determining the first use case state diagram associated with the first query comprises:
processing the first query to determine an intent of the first query;
determining a use case associated with the intent of the first query from the plurality of predetermined use cases; and
determining the first user case state diagram corresponding to the first use case.

10. The server computer of claim 7, wherein transformation rules comprise instructions for translating the data from the at least one data source to response data in the uniform data structure.

11. The server computer of claim 7, wherein a data format comprises one of a group comprising: XML, a table, an embedded tree structure, file system, plain text, and rich text.

12. A non-transitory computer-readable medium comprising instructions stored thereon that are executable by at least one processor to cause a computing device to perform operations comprising:
determining a first use case state diagram, of a plurality of use case state diagrams, associated with a first query received via a computing device, the first use case state diagram comprising a plurality of nodes to traverse to satisfy a query;
traversing the first use case state diagram to determine data from one or more data sources to be used to generate a response to the first query;
during traversal of the first use case state diagram, receiving response data in response to data requested from the computing device;
determining that the response data is a second query corresponding to a second use case state diagram of the plurality of use case state diagrams;
traversing the second use case state diagram to provide a response to the second query;
receiving a third query from the computing device;
determining that the third query corresponds to the first use case state diagram, wherein generated values for a plurality of nodes of the first use case state diagram continue to persist in memory;
continuing traversing the first use case state diagram, from a node where traversal stopped when the second query was received, to determine data from one or more data sources to be used to generate the response to the first query;

transforming the data for the response to the first query from at least a first format into a single uniform data structure based on transformation rules corresponding to the one or more data sources, the single uniform data structure further comprising a query data field and a user interface type data field;

populating the query data field of the single uniform data structure with text of the first query;

populating the user interface type data field with a value indicating instructions for rendering the data one or more data fields of the single uniform data structure; and providing the single uniform data structure to the computing device to be rendered in a user interface as a response to the first query according to instructions of the user interface type data field of the single uniform data structure.

13. The non-transitory computer-readable medium of claim 12, wherein transformation rules comprise instructions for translating the data from the at least one data source to response data in the uniform data structure.

14. The method of claim 1, the single uniform data structure further comprising a speech response field comprising text to be provided audibly in response to the query.

15. The method of claim 1, wherein the value indicating instructions for rendering the one or more data fields of the uniform data structure comprises at least one of instructions for displaying map data, instructions for displaying a table or list, instructions for displaying a selectable table, instructions for responding to the query in voice speech, or instructions for pushing a notification.

16. The method of claim 1, wherein the transformation rules comprise selecting certain fields, hiding certain fields, changing one or more field names, calculating one or more fields, merging fields, and mapping one field to another field.

17. The method of claim 2, wherein the plurality of data fields comprise at least one of a name field, a subtitle field, a description field, and a type field.

18. The method of claim 1, wherein the uniform data structure further comprises a user interface title object comprising a text field and an icon field.

19. The method of claim 1, wherein determining that the response data is a second query corresponding to a second use case state diagram, comprises:

determining that the second query does not correspond to a modeled query;

based on determining that the second query does not correspond to a modeled query, generating recommended queries to be presented for selection; and receiving a selection of one recommended query of the generated recommended queries, the one recommended query associated with a use case corresponding to the second use case state diagram.

20. The server computer of claim 7, wherein determining that the response data is a second query corresponding to a second use case state diagram, comprises:

determining that the second query does not correspond to a modeled query;

based on determining that the second query does not correspond to a modeled query, generating recommended queries to be presented for selection; and receiving a selection of one recommended query of the generated recommended queries, the one recommended query associated with a use case corresponding to the second use case state diagram.

\* \* \* \* \*